(12) United States Patent
Cheng

(10) Patent No.: US 7,142,626 B2
(45) Date of Patent: Nov. 28, 2006

(54) APPARATUS AND METHOD OF CONTROLLING MULTI-INPUT-SINGLE-OUTPUT SYSTEMS

(76) Inventor: George Shu-Xing Cheng, 2868 Prospect Park Dr. Suite 300, Rancho Cordova, CA (US) 95670

( * ) Notice: Subject to any disclaimer, the term of this patent is extended or adjusted under 35 U.S.C. 154(b) by 340 days.

(21) Appl. No.: 10/857,520

(22) Filed: May 28, 2004

(65) Prior Publication Data

US 2005/0004687 A1    Jan. 6, 2005

(51) Int. Cl.
*G11C 19/00* (2006.01)
*G06F 3/00* (2006.01)
(52) U.S. Cl. ............................................. 377/70; 710/3
(58) Field of Classification Search .................. 377/70; 710/3; 706/15
See application file for complete search history.

(56) References Cited

U.S. PATENT DOCUMENTS

| | | |
|---|---|---|
| 6,055,524 A | 4/2000 | Cheng |
| 6,360,131 B1 | 3/2002 | Cheng |
| 6,556,980 B1 | 4/2003 | Cheng |
| 6,684,112 B1 | 1/2004 | Cheng |
| 6,684,115 B1 | 1/2004 | Cheng |

OTHER PUBLICATIONS

Filing Receipt mailed Jul. 3, 2003, Specification and Drawings of U.S. Appl. No. 60/474,688, filed May 30, 2003, applicant: George Shu-Xing Cheng.

Notice of Publication (Publication No. US-2005-0038532-A1, Publication Date: Feb. 17, 2005), Specification, Claims and Drawings of U.S. Appl. No. 10/916,084, filed Aug. 11, 2004, applicant: George Shu-Xing Cheng.

Filing Receipt mailed Nov. 5, 2003, Specification and Drawings of U.S. Appl. No. 60/494,488, filed Aug. 12, 2003, applicant: George Shu-Xing Cheng.

Filing Receipt mailed Dec. 2, 2004, Specification, Claims and Drawings of U.S. Appl. No. 10/969,485, filed Oct. 19, 2004, applicants: George Shu-Xing Cheng and Steven L. Mulkey.

Filing Receipt mailed Dec. 12, 2003, Specification and Drawings of U.S. Appl. No. 60/513,126, filed Oct. 20, 2003, applicants: George Shu-Xing Cheng and Steven L. Mulkey.

*Primary Examiner*—David Vincent
*Assistant Examiner*—Nicole Allen
(74) *Attorney, Agent, or Firm*—Peter R. Leal, Esq.; DLA Piper US LLP

(57) ABSTRACT

An apparatus and method is disclosed for automatically controlling multi-input-single-output (MISO) systems or processes. The control output signal of a single-input-single-output (SISO) automatic controller is converted by a reverse, sequential or combined split-range setter into a plurality of ranges of signals so that the SISO controller is converted to a single-input-multi-output (SIMO) automatic controller based on certain criteria; and the resulting controller output signals are able to manipulate a plurality of actuators to control one continuous process variable in different operating conditions. Without the need of building process mathematical models, this inventive apparatus and method is useful for automatically controlling unevenly paired multivariable systems or processes where there are more system inputs than outputs including but not limited to pH processes, chemical reactors, and air handling units.

51 Claims, 15 Drawing Sheets

APPARATUS AND METHOD OF CONTROLLING MULTI-INPUT-SINGLE-OUTPUT SYSTEMS

The invention relates to automatic control of multi-input-single-output (MISO) systems including industrial processes, equipment, facilities, buildings, homes, devices, engines, robots, vehicles, aircraft, space-vehicles, appliances and other systems, and more particularly to a method and apparatus for automatically controlling a continuous process variable by manipulating one or more actuators individually or simultaneously. The control system is able to force the controlled process variable to track its setpoint under significant system dynamic changes due to batch, load, production, configuration, season, time of the day, or operating conditions, and under large disturbances originating from product flow, plant upsets, weather, wear and tear of sensors, actuators, or other components.

Multi-input-single-output (MISO) systems are commonly found in situations where 2 or more opposite control actions are used in order to control the process variable in different operating conditions. In these cases, two or more actuators are used to bring in the opposite control actions. For instance, In a wastewater treatment process, acid or caustic is added to control the pH value and keep it near its neutrality by using 2 actuators, namely an acid control valve and a caustic control valve;

A chemical reactor where steam is used to raise the reactor temperature during its startup stage and cooling water is used to suppress the reactor temperature and keep it within its safety range during the reaction stage when heat is generated due to exothermal chemical reaction.

An air handling unit (AHU) in a building control system where a heating valve manipulates the warm water flow, a cooling valve manipulates the chilled water flow, and a damper manipulates the fresh outside air flow. Depending on the temperature setpoint and inside and outside environment, the supply air temperature can be controlled by using one or more actuators.

In these applications, control actions cancel each other. To avoid the fighting among multiple control actions, we may apply "reverse split-range control" where one actuator is working and the others are shut off or remain in fixed positions.

There are multi-input-single-output (MISO) systems where the scale of the control action is so large during certain operating conditions that more actuators are used. For instance, both a coarse valve and a fine valve may be used to dose acid for pH control. When near neutrality, a very small dose of acid can cause the pH to change. The use of one valve may not cover the wide range needed for effective acid flow control.

a chemical reactor where a large cooling water valve may be installed working in parallel with a regular size cooling water valve. In case the regular cooling water stream is insufficient to control the reactor temperature, a sufficient amount of cooling water can be brought into the system to suppress the reactor temperature to prevent a runaway situation.

In these applications, where the control actions compliment each other, we may apply "sequential split-range control" where multiple actuators are brought into action gradually depending on the operating conditions.

Since the input-output relationship between each actuator and the controlled process variable can be considered a sub-system with its own dynamics, using one controller with fixed tuning parameters cannot handle the significant dynamic changes when switching between these sub-systems. Thus, MISO systems are difficult to control resulting in low production efficiency, poor product quality, and high energy consumption. In addition, frequent manual tuning of the controller parameters causes high maintenance cost.

The term "mechanism" is used herein to represent hardware, software, or any combination thereof. The term "process" is used herein to represent a physical system or process with inputs and outputs that have dynamic relationships.

Description

A. 1-input-2-Output Model-Free Adaptive (MFA) Controller

Figure 1:
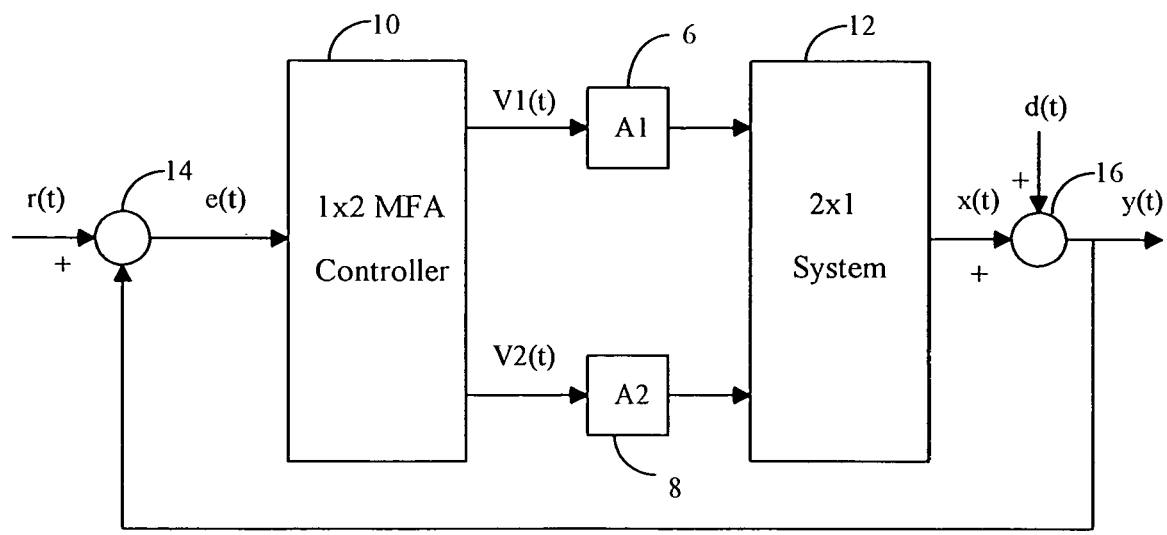
FIG. 1 is a block diagram illustrating a 1-input-2-output (1×2) model-free adaptive (MFA) controller that controls a 2-input-1-output (2×1) system.

FIG. 1 illustrates a 1-input-2-output (1×2) MFA controller that controls a 2-input-1-output (2×1) system. The control system consists of a 1-input-2-output (1×2) MFA controller 10, a 2-input-1-output (2×1) system 12, actuator $A_1$ 6, actuator $A_2$ 8, and signal adders, 14, 16. The signals shown in FIG. 1 are as follows:

r(t)—Setpoint.
y(t)—Measured Variable or the Process Variable, y(t)=x(t)+d(t).
x(t)—System Output.
$V_1(t)$—Controller Output 1 to manipulate Actuator $A_1$.
$V_2(t)$—Controller Output 2 to manipulate Actuator $A_2$.
d(t)—Disturbance, the disturbance caused by noise or load changes.
e(t)—Error between the Setpoint and Measured Variable, e(t)=r(t)−y(t).

The control objective is for the controller to produce outputs $V_1(t)$ and $V_2(t)$ to manipulate actuators $A_1$ and $A_2$ so that the measured variable y(t) tracks the given trajectory of its setpoint r(t) under variations of setpoint, disturbance, and process dynamics. In other words, the task of the MFA controller is to minimize the error e(t) in an online fashion.

We select the objective function for the MFA control system as $$E_S(t) = \frac{1}{2}e(t)^2 \qquad (1)$$

$$= \frac{1}{2}[r(t) - y(t)]^2.$$

The minimization of $E_s(t)$ is achieved by (i) the regulatory control capability of the MFA controller whose outputs $V_1(t)$ and $V_2(t)$ manipulate the manipulated variables forcing the process variable y(t) to track its setpoint r(t); and (ii) the adjustment of the MFA controller weighting factors that allow the controller to deal with the dynamic changes, large disturbances, and other uncertainties of the control system.

Figure 2:
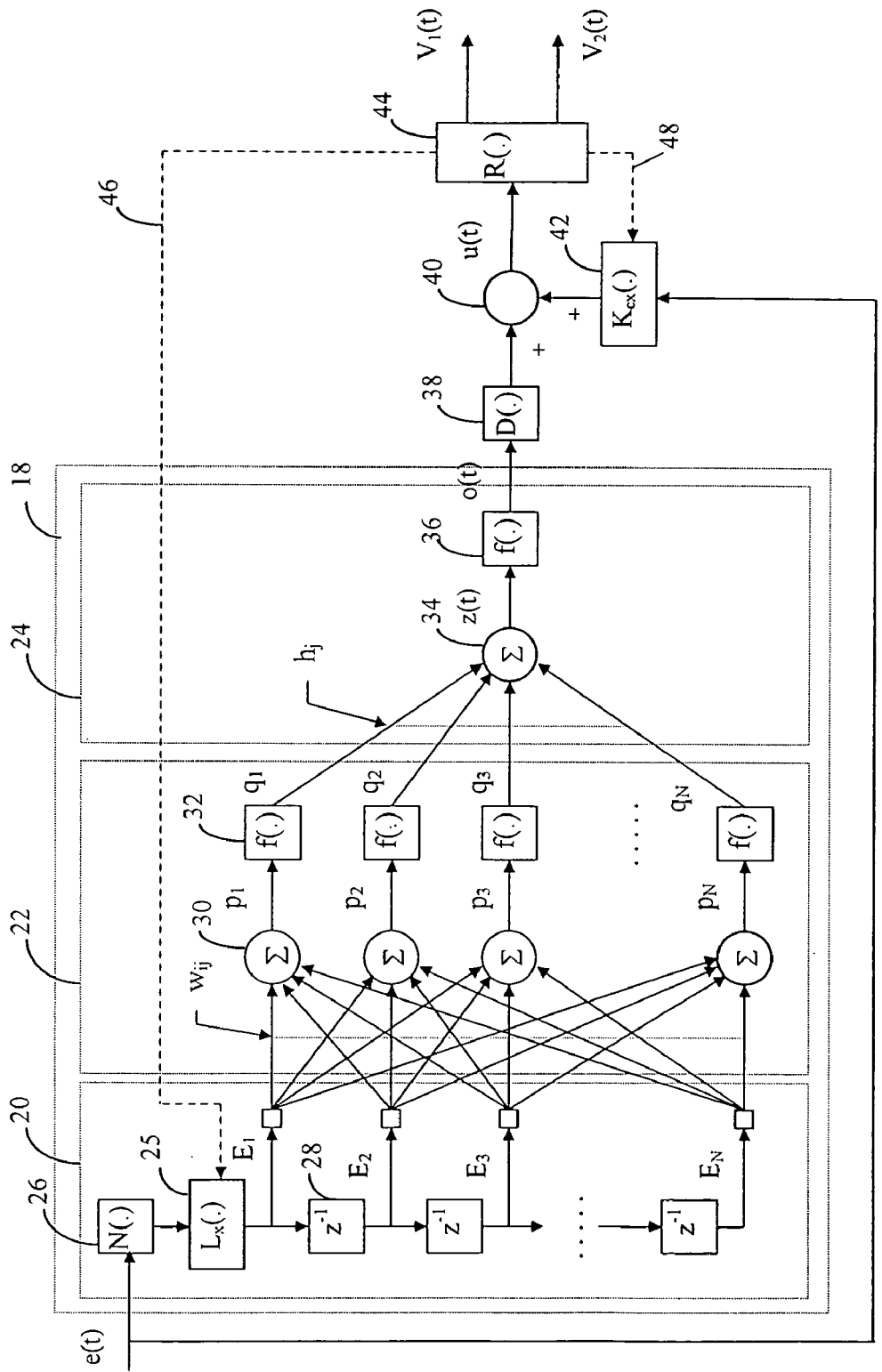
FIG. 2 is a block diagram illustrating the architecture of a 1-input-2-output (1×2) model-free adaptive (MFA) controller.

FIG. 2 illustrates the architecture of a 1-input-2-output model-free adaptive (MFA) controller. A linear multilayer neural network 18 is used in the design of the controller. The neural network has one input layer 20, one hidden layer 22 with N neurons, and one output layer 24 with one neuron.

The input signal e(t) to the input layer 20 is first converted to a normalized error signal $E_1$ with a range of −1 to 1 by using the normalization unit 26, where N(·) denotes a normalization function. The output of the normalization unit 26 is then scaled by a scaling function $L_x(·)$ 25:

$$L_x(\cdot) = \frac{K_{cx}}{T_{cx}}. \qquad (2)$$

The value of $E_1$ at time t is computed with function $L_x(\cdot)$ and N(·):

$$E_1 = \frac{K_{cx}}{T_{cx}} N(e(t)), \qquad (3)$$

where $K_{cx}>0$ is defined as controller gain and $T_{cx}$ is the user selected process time constant. $K_{cx}$ is used to compensate for the process steady-state gain and $T_{cx}$ provides information for the dynamic behavior of the process. When the error signal is scaled with these parameters, the controller's behavior can be manipulated by adjusting the parameters.

The $E_1$ signal then goes iteratively through a series of delay units 28, where $z^{-1}$ denotes the unit delay operator. A set of normalized and scaled error signals $E_2$ to $E_N$ is then generated. In this way, a continuous signal e(t) is converted to a series of discrete signals, which are used as the inputs to the neural network. These delayed error signals $E_i$, i=1, ... N, are then conveyed to the hidden layer through the neural network connections. This is equivalent to adding a feedback structure to the neural network. Then the regular static multilayer neural network becomes a dynamic neural network.

A model-free adaptive controller uses a dynamic block such as a dynamic neural network. A dynamic block is just another name for a dynamic system, whose inputs and outputs have dynamic relationships.

Each input signal can be conveyed separately to each of the neurons in the hidden layer 22 via a path weighted by an individual weighting factor $w_{ij}$, where i=1,2, ... N, and j=1,2, ... N. The inputs to each of the neurons in the hidden layer are summed by adder 30 to produce signal $p_j$. Then the signal $p_j$ is filtered by an activation function 32 to produce $q_j$, where j denotes the jth neuron in the hidden layer.

A piecewise continuous linear function $f(x)$ mapping real numbers to [0,1] is used as the activation function in the neural network as defined by $$f(x) = 0, \qquad \text{if } x < -\frac{b}{a} \qquad (4a)$$

$$f(x) = ax + b, \qquad \text{if } -\frac{b}{a} \le x \le \frac{b}{a} \qquad (4b)$$

$$f(x) = 1, \qquad \text{if } x > \frac{b}{a} \qquad (4c)$$

where a is an arbitrary constant and b=½.

Each output signal from the hidden layer is conveyed to the single neuron in the output layer 24 via a path weighted by an individual weighting factor $h_j$, where j=1,2, ... N. These signals are summed in adder 34 to produce signal z(·), and then filtered by activation function 36 to produce the output o(·) of the neural network 18 with a range of 0 to 1.

A de-normalization function 38 defined by $$D(x) = 100x, \quad (5)$$

maps the o(·) signal back into the real space to produce the controller signal u(t).

The algorithm governing the input-output of the controller consists of the following difference equations:

$$p_j(n) = \sum_{i=1}^{N} w_{ij}(n) E_i(n), \quad (6)$$

$$q_j(n) = f(p_j(n)), \quad (7)$$

$$o(n) = f\left(\sum_{j=1}^{N} h_j(n) q_j(n)\right), \quad (8)$$

$$= a \sum_{j=1}^{N} h_j(n) q_j(n) + b,$$

where the variable of function $f(\cdot)$ is in the range specified in Equation (4b), and o(n) is bounded by the limits specified in Equations (4a) and (4c). The controller signal u(t) becomes $$u(t) = K_{cx}(\cdot) e(t) + D(o(t)) \quad (9)$$

$$= K_{cx}(\cdot) e(t) + 100\left[a \sum_{j=1}^{N} h_j(n) q_j(n) + b\right],$$

where n denotes the nth iteration; o(t) is the continuous function of o(n); D(·) is the de-normalization function; and $K_{cx}(\cdot) > 0$, the controller gain 42, is a variable used to adjust the magnitude of the controller. This is the same variable as in the scaling function $L_x(\cdot)$ 25 and is useful to fine tune the controller performance or keep the system stable. The controller signal u(t) then goes into a split-range setter R(·) 44 to produce the controller outputs $V_1(t)$ and $V_2(t)$.

An online learning algorithm as described in the U.S. Pat. No. 6,556,980 B1 is an example of one algorithm that can be used to continuously update the values of the weighting factors of the MFA controller as follows:

$$\Delta w_{ij}(n) = a^2 \eta e(n) E_1(n) h_j(n), \quad (10)$$

$$\Delta h_j(n) = a \eta e(n) q_j(n). \quad (11)$$

The equations (1) through (11) work for both process direct-acting or reverse acting types. Direct-acting means that an increase in the process input will cause its output to increase, and vice versa. Reverse-acting means that an increase in the process input will cause its output to decrease, and vice versa. To keep the above equations working for both direct and reverse acting cases, e(t) is calculated differently based on the acting type of the process as follows:

$$e(t) = r(t) - y(t), \text{ if direct acting} \quad (12a)$$

$$e(t) = -[r(t) - y(t)], \text{ if reverse acting} \quad (12b)$$

This is a general treatment for the process acting types. It applies to all model-free adaptive controllers to be introduced below.

Figure 3:
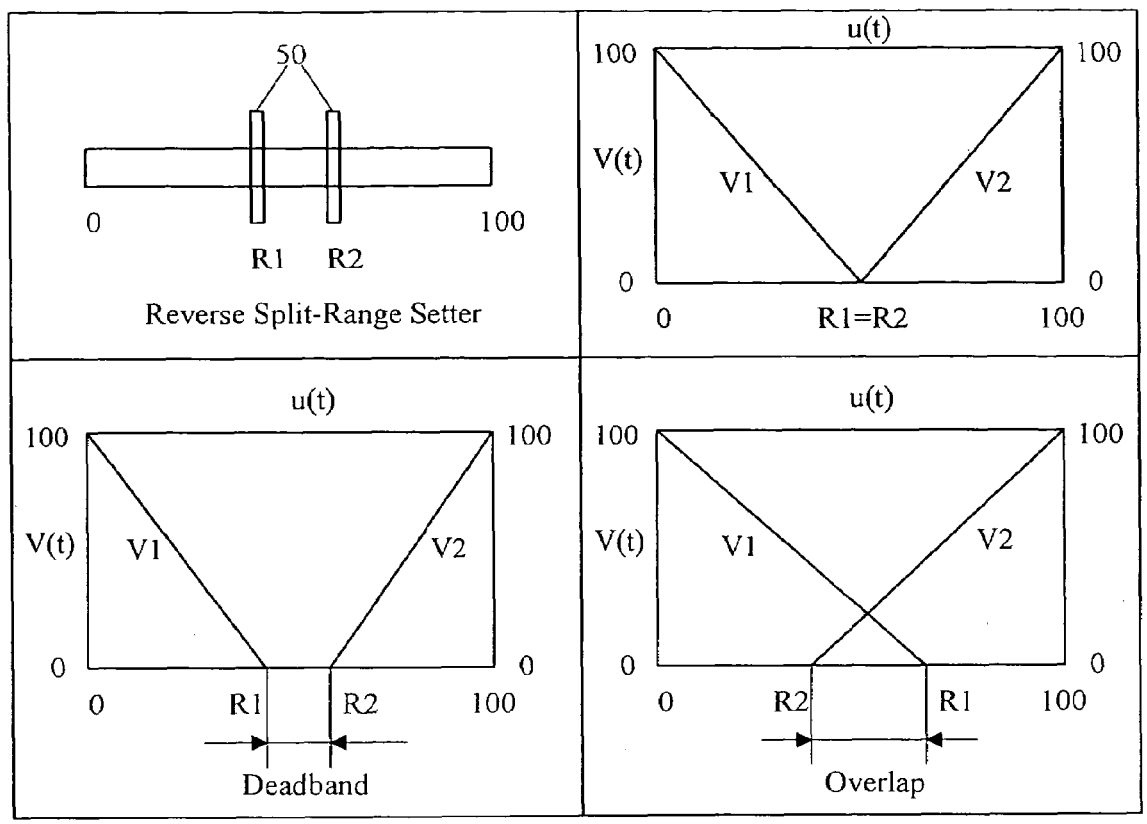
FIG. 3 is a drawing illustrating a mechanism of a reverse split-range setter that can easily split a controller signal into 2 or more ranges to manipulate 2 different actuators individually, simultaneously, or neither.

FIG. 3 illustrates a reverse split-range setter that splits the controller signal u(t) into 2 or more ranges to manipulate 2 different actuators individually, simultaneously, or neither by moving and setting the knobs $R_1$ and $R_2$ 50, respectively. The controller outputs $V_1(t)$ and $V_2(t)$ are calculated based on the following formulas as implemented in the split-range setter mechanism 44:

$$V_1(t) = -100 \frac{u(t)}{R_1} + 100, \quad \text{for all } u(t) \in [0, R_1] \quad (13a)$$

$$V_1(t) = 0; \quad \text{for all } u(t) \in (R_1, 100] \quad (13b)$$

where $0 < R_1 \leq 100$, which defines the split range of u(t) for controller output $V_1(t)$; and $$V_2(t) = -100 \frac{u(t) - 100}{R_2 - 100} + 100, \quad \text{for all } u(t) \in [R_2, 100] \quad (14a)$$

$$V_2(t) = 0, \quad \text{for all } u(t) \in [0, R_2) \quad (14b)$$

where $0 \leq R_2 < 100$, which defines the split range of u(t) for controller output $V_2(t)$. The signals u(t), $V_1(t)$, and $V_2(t)$ all have a working range of 0% to 100%. In this design, the control valves are shut at 0% during their off position. We can move and set the $R_1$ and $R_2$ knobs freely within its (0, 100) range to produce controller outputs $V_1(t)$, and $V_2(t)$, where there may be a deadband, or an overlap, or no gaps in between. These 3 types of settings are all useful depending on the actuators and actual applications.

To expand the design, we can easily rescale each of the output signals $V_1(t)$ and $V_2(t)$ from its 0% to 100% range to an engineering value range by using a linear function. In addition, control limits and constraints can be applied to these signals for safety or other reasons to limit the control actions. These design concepts can be readily applied to all the controllers presented in this patent.

As illustrated in FIG. 2, the information of $R_1$ and $R_2$ inside the split-range setter is routed through signal lines 46 and 48 to elements $L_x(\cdot)$ 25 and $K_{cx}(\cdot)$ 42, respectively. Based on this design, the user can enter 2 sets of controller gains $K_1$, $K_2$ and time constants $T_{c1}$, $T_{c2}$ when configuring the controller. These are estimated controller gains and process time constants relating to the dynamics of the sub-systems between the manipulated variables $V_1(t)$ and $V_2(t)$ to the controlled process variable y(t), respectively.

To compensate for the static gain changes caused by the split-range setting of $R_1$ and $R_2$, we can re-scale the controller gains based on the following formulas:

$$K_{c1} = K_1 \frac{R_1}{100}, \quad (15)$$

$$K_{c2} = K_2 \frac{100 - R_2}{100}, \quad (16)$$

where $K_1$ and $K_2$ are configured controller gains for $V_1(t)$ and $V_2(t)$, respectively.

Depending on tile current value of u(t), the corresponding controller parameters are used. Thus, the error signal $E_1$ of the neural network and the controller signal u(t) are calculated based on the corresponding parameters of $K_c$ and $T_c$ as follows:

$$E_1 = \frac{K_{c1}}{T_{c1}} N(e(t)), \qquad \text{for all } u(t) \in [0, R_1] \qquad (17a)$$

$$u(t) = K_{c1} e(t) + 100 \left[ a \sum_{j=1}^{N} h_j(n) q_j(n) + b \right], \quad \text{for all } u(t) \in [0, R_1] \qquad (17b)$$

$$E_1 = \frac{K_{c2}}{T_{c2}} N(e(t)), \qquad \text{for all } u(t) \in [R_2, 100] \qquad (18a)$$

$$u(t) = K_{c2} e(t) + 100 \left[ a \sum_{j=1}^{N} h_j(n) q_j(n) + b \right], \quad \text{for all } u(t) \in [R_2, 100] \qquad (18b)$$

Then the controller outputs $V_1(t)$ and $V_2(t)$ can still be calculated based on Equations (13) and (14).

There are two special cases where we can make a more detailed design. In cases when $R_1 > R_2$ and u(t) is inside the signal overlap area; and when $R_1 < R_2$ and u(t) is inside the deadband, we can simply let $$K_c = \frac{K_{c1} + K_{c2}}{2}, \quad \text{for } u(t) \text{ inside deadband or overlap area} \qquad (19)$$

$$T_c = \frac{T_{c1} + T_{c2}}{2}, \quad \text{for } u(t) \text{ inside deadband or overlap area} \qquad (20)$$

and then calculate $E_1$ and u(t) based on the averaged $K_c$ and $T_c$ of Equations 19 and 20.

Since model-free adaptive (MFA) controllers are adaptive, the detailed designs described in Equations (15), (16), (19), and (20) may not be necessary. However, they are useful for the control systems with non-adaptive controllers like PID controllers.

Figure 4:
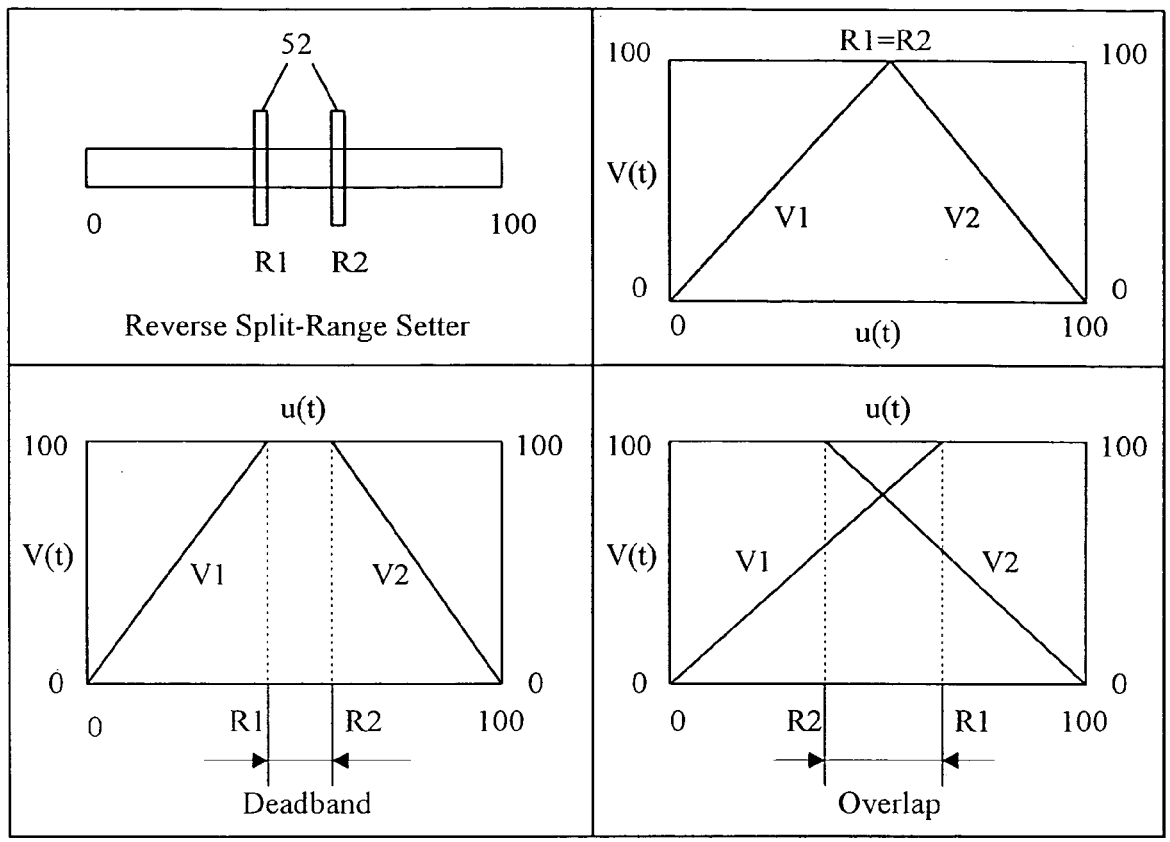
FIG. 4 is a drawing illustrating a mechanism of a reverse split-range setter that is an alternative design to split a controller signal into 2 or more ranges to manipulate 2 different actuators individually, simultaneously, or neither.

FIG. 4 illustrates an alternative design of the reverse split-range setter, where $V_1(t)$ starts from 0 instead of 100 and $V_2(t)$ ends at 0 instead of 100. It splits the controller signal u(t) into 2 or more ranges to manipulate 2 different actuators individually, simultaneously, or neither by moving and setting the knobs $R_1$ and $R_{52}$, respectively. The controller outputs $V_1(t)$ and $V_2(t)$ are calculated based on the following formulas that can be implemented in the split-range setter mechanism 44:

$$V_1(t) = 100 \frac{u(t) - R_1}{R_1} + 100, \quad \text{for all } u(t) \in [0, R_1] \qquad (21a)$$

$$V_1(t) = 100, \qquad \text{for all } u(t) \in (R_1, 100] \qquad (21b)$$

where $0 < R_1 \leq 100$, which defines the split range of u(t) for controller output $V_1(t)$; and $$V_2(t) = -100 \frac{u(t) - R_2}{100 - R_2} + 100, \quad \text{for all } u(t) \in [R_2, 100] \qquad (22a)$$

$$V_2(t) = 100, \qquad \text{for all } u(t) \in [0, R_2) \qquad (22b)$$

where $0 \leq R_2 < 100$, which defines the split range of u(t) for controller output $V_2(t)$. In these equations, u(t) is calculated based on Equations (17) and (18), respectively.

The signals u(t), $V_1(t)$, and $V_2(t)$ all have a working range of 0% to 100%. This reverse split-range setter design is useful for situations where valves are wide open at 100% during their off position.

Figure 5:
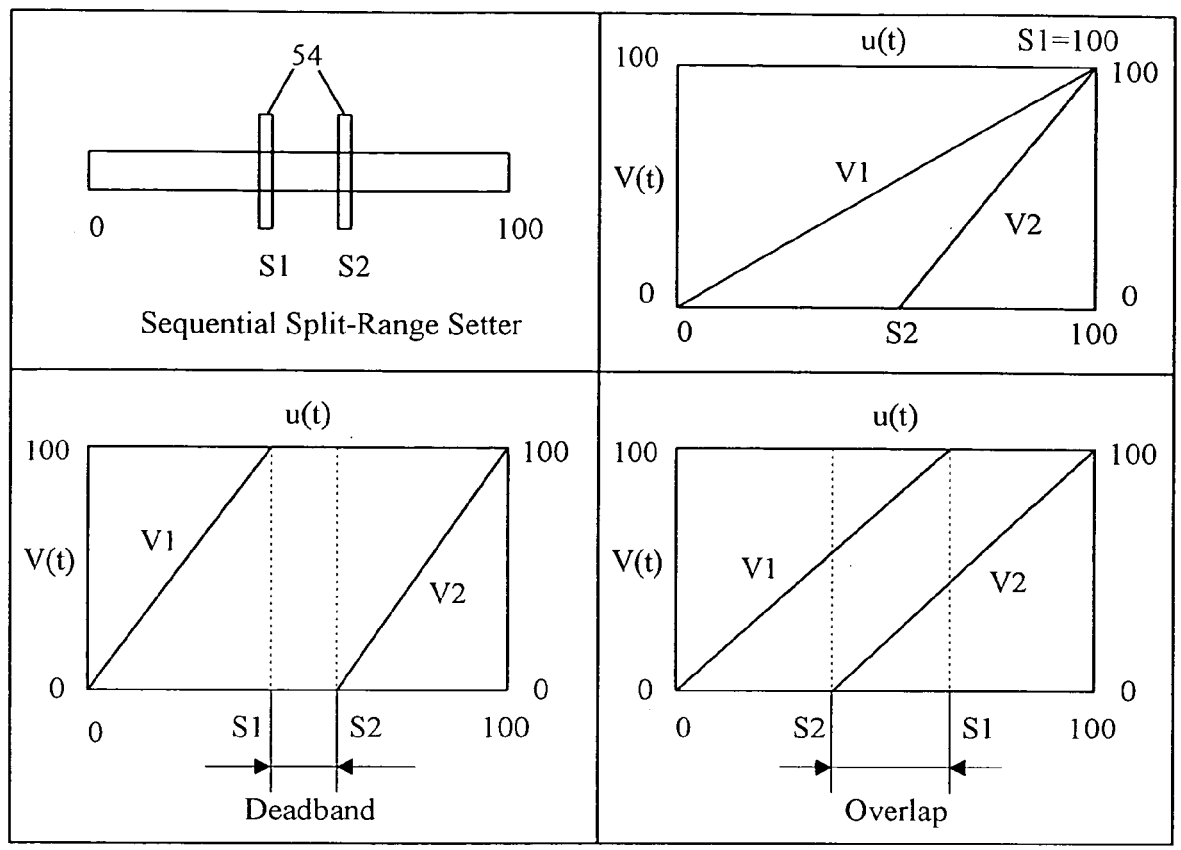
FIG. 5 is a drawing illustrating a mechanism of a sequential split-range setter that can easily convert a controller signal into 2 or more ranges to manipulate 2 different actuators individually, simultaneously, or neither.

FIG. 5 illustrates a sequential split-range setter that converts the controller signal u(t) into 2 or more ranges to manipulate 2 different actuators individually, simultaneously, or neither by moving and setting the knobs $S_1$ and $S_2$ 54, respectively.

The controller outputs $V_1(t)$ and $V_2(t)$ are calculated based on the following formulas as implemented in the split-range setter mechanism 44:

$$V_1(t) = 100 \frac{u(t) - S_1}{S_1} + 100, \quad \text{for all } u(t) \in [0, S_1] \qquad (23a)$$

$$V_1(t) = 100, \qquad \text{for all } u(t) \in (S_1, 100] \qquad (23b)$$

where $0 < S_1 \leq 100$, which defines the split range of u(t) for controller output $V_1(t)$; and $$V_2(t) = -100 \frac{u(t) - 100}{S_2 - 100} + 100, \quad \text{for all } u(t) \in [S_2, 100] \qquad (24a)$$

$$V_2(t) = 0, \qquad \text{for all } u(t) \in [0, S_2) \qquad (24b)$$

where $0 \leq S_1 < 100$, which defines the split range of u(t) for controller output $V_2(t)$. The signals u(t), $V_1(t)$, and $V_2(t)$ all have a working range of 0% to 100%. In this design, the control valves are shut at 0% during their off position.

As illustrated in FIG. 5, we can move and set the $S_1$ and $S_2$ knobs freely within its (0, 100) range to produce controller outputs $V_1(t)$, and $V_2(t)$, where there may be a deadband, or an overlap, or no gaps in between. These 3 types of settings are all useful depending on the actuators and actual applications.

Figure 6:
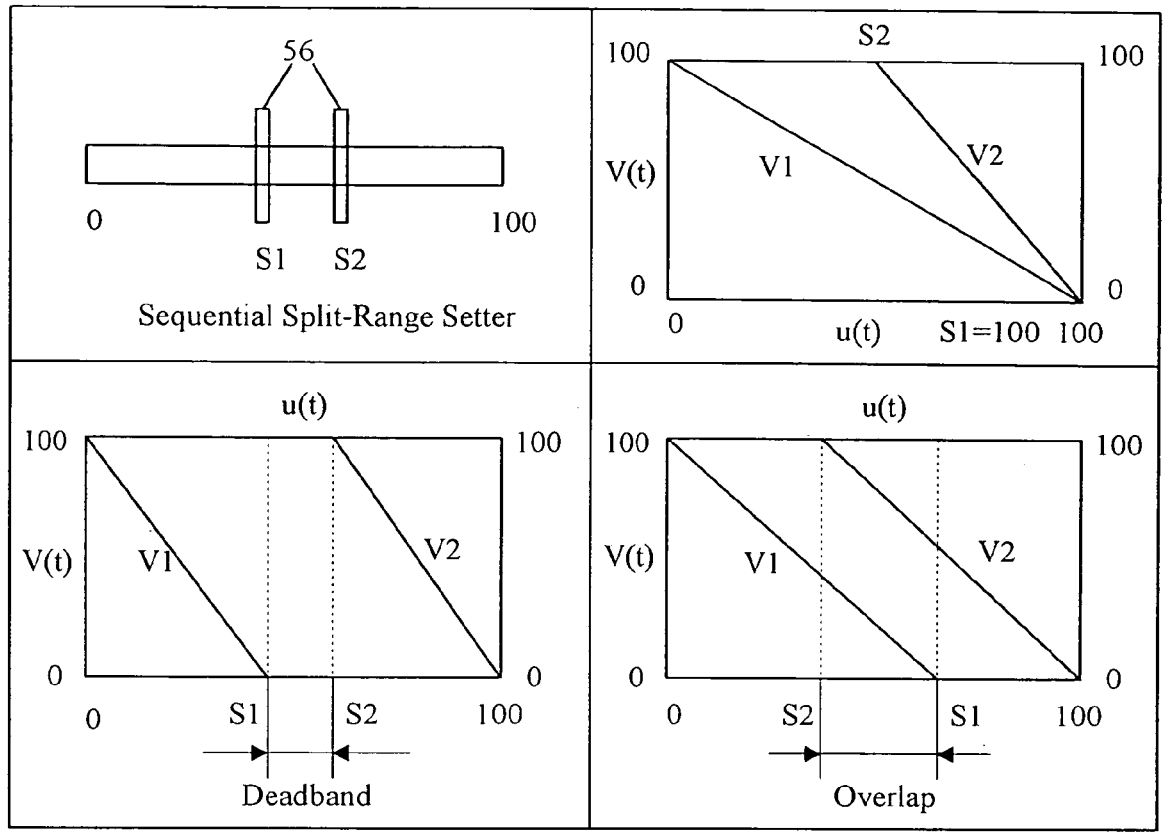
FIG. 6 is a drawing illustrating a mechanism of a sequential split-range setter that is an alternative design to convert a controller signal into 2 or more ranges to manipulate 2 different actuators individually, simultaneously, or neither.

FIG. 6 illustrates an alternative design of the sequential split-range setter, where $V_1(t)$ and $V_2(t)$ start from 100 instead of 0. It converts the controller signal u(t) into 2 or more ranges to manipulate 2 different actuators individually, simultaneously, or neither by moving and setting the knobs $S_1$ and $S_2$ 56, respectively. The controller outputs $V_1(t)$ and $V_2(t)$ are calculated based on the following formulas that can be implemented in the split-range setter mechanism 44:

$$V_1(t) = -100 \frac{u(t)}{S_1} + 100, \quad \text{for all } u(t) \in [0, S_1] \qquad (25a)$$

$$V_1(t) = 0, \qquad \text{for all } u(t) \in (S_1, 100] \qquad (25b)$$

where $0 < S_1 \leq 100$, which defines the split range of u(t) for controller output $V_1(t)$.

$$V_2(t) = -100 \frac{u(t) - S_2}{100 - S_2} + 100, \quad \text{for all } u(t) \in [S_2, 100] \qquad (26a)$$

$$V_2(t) = 100, \qquad \text{for all } u(t) \in [0, S_2) \qquad (26b)$$

where $0 \leq S_2 < 100$, which defines the split range of u(t) for controller output $V_2(t)$.

In these equations, u(t) is calculated based on Equations (17) and (18), respectively. This sequential split-range setter design is useful for situations where valves are wide open at 100% during their off position.

The signals u(t), $V_1(t)$, and $V_2(t)$ all have a working range of 0% to 100%. We can easily rescale each of the output signals $V_1(t)$ and $V_2(t)$ from its 0% to 100% range to an engineering value range by using a linear function. In addition, control limits and constraints can be applied to these signals for safety or other reasons to limit the control actions.

1-Input-3-Output Model-Free Adaptive Controller

Figure 7:
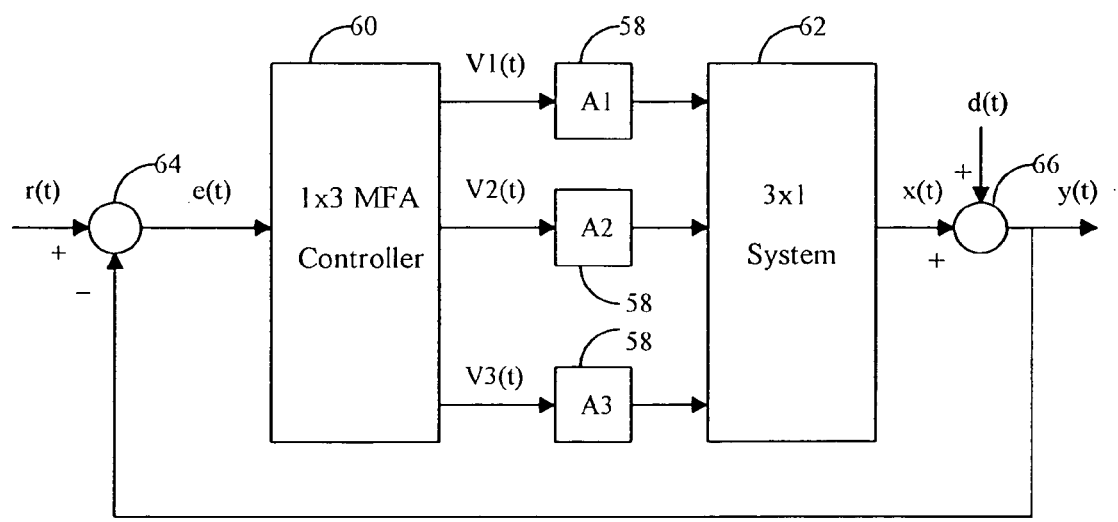
FIG. 7 is a block diagram illustrating a 1-input-3-output (1×3) model-free adaptive (MFA) controller that controls a 3-input-1-output (3×1) system.

FIG. 7 illustrates a 1-input-3-output (1×3) MFA controller that controls a 3-input-1-output (3×1) system. The control system consists of a 1-input-3-output (1×3) MFA controller 60, a 3-input-1-output (3×1) system 62, actuators $A_1$ through $A_3$ 58, and signal adders, 64, 66. The signals shown in FIG. 7 are as follows:

r(t)—Setpoint.

y(t)—Measured Variable or the Process Variable, y(t)=x(t)+d(t). x(t)—System Output. $V_1(t)$—Controller Output 1 to manipulate Actuator $A_1$. $V_2(t)$—Controller Output 2 to manipulate Actuator $A_2$. $V_3(t)$—Controller Output 3 to manipulate Actuator $A_3$. d(t)—Disturbance, the disturbance caused by noise or load changes. e(t)—Error between the Setpoint and Measured Variable, e(t)=r(t)−y(t).

The control objective is for the controller to produce outputs $V_1(t)$, $V_2(t)$ and $V_3(t)$ to manipulate actuators $A_1$, $A_2$ and $A_3$ so that the measured variable y(t) tracks the given trajectory of its setpoint r(t) under variations of setpoint, disturbance, and process dynamics.

Figure 8:
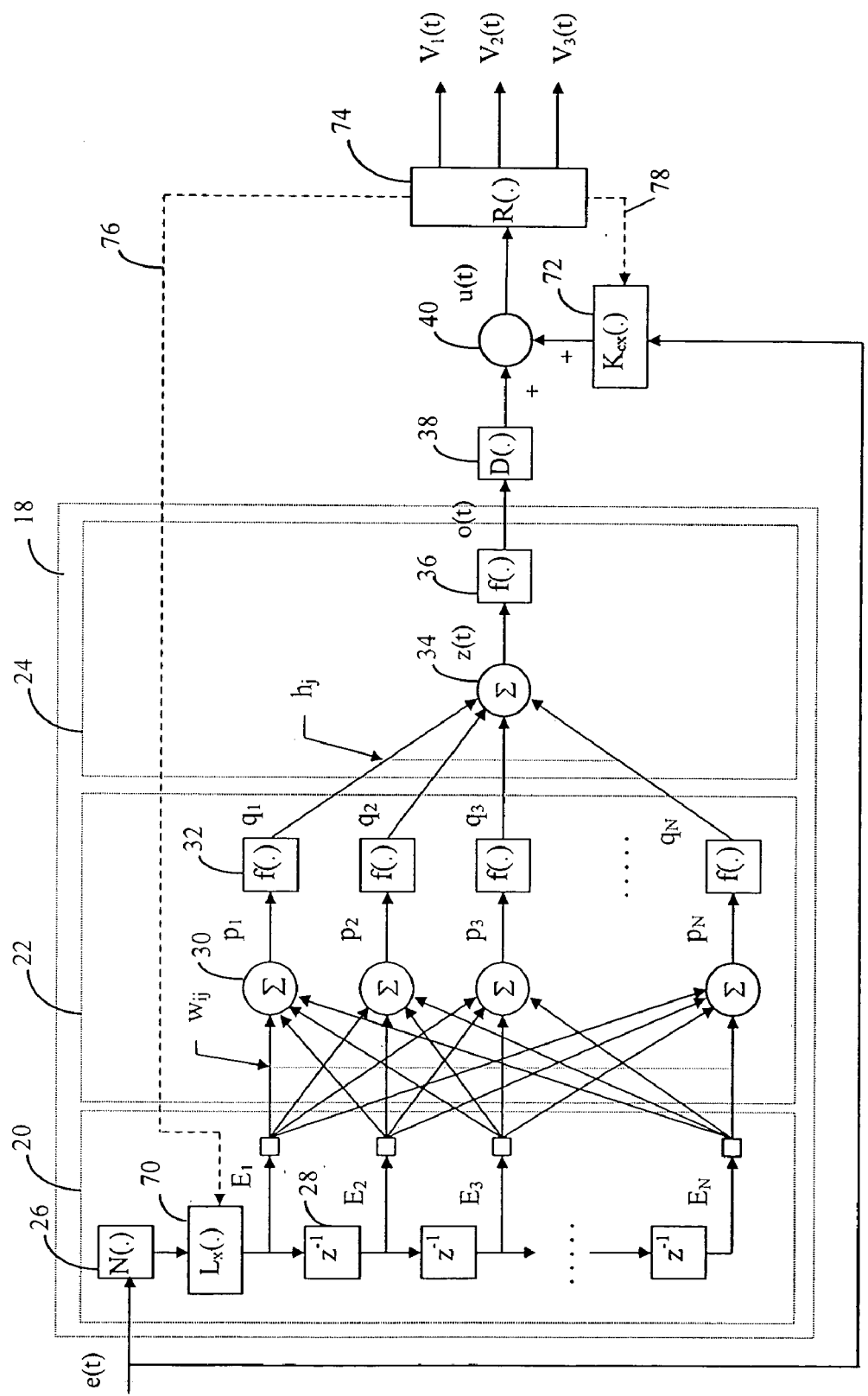
FIG. 8 is a block diagram illustrating the architecture of a 1-input-3-output (1×3) model-free adaptive (MFA) controller.

FIG. 8 illustrates the architecture of a 1-input-3-output model-free adaptive (MFA) controller. The elements 18 through 40 are the same as described for the 1-Input-2-Output MFA controller. The controller signal u(t) goes into a split-range setter R(·) 74 to produce the controller outputs $V_1(t)$, $V_2(t)$, and $V_3(t)$.

The information inside the split-range setter 74 is routed through signal lines 76 and 78 to elements $L_x(\cdot)$ 70 and $K_{cx}(\cdot)$ 72, respectively. Based on this design, the user can enter 3 sets of controller gains $K_{c1}$, $K_{c2}$, $K_{c3}$ and time constants $T_{c1}$, $T_{c2}$, $T_{c3}$ when configuring the controller. These are estimated controller gains and process time constants relating to the dynamics of the sub-systems between the manipulated variables $V_1(t)$, $V_2(t)$ and $V_3(t)$ to the controlled process variable y(t), respectively.

Figure 9:
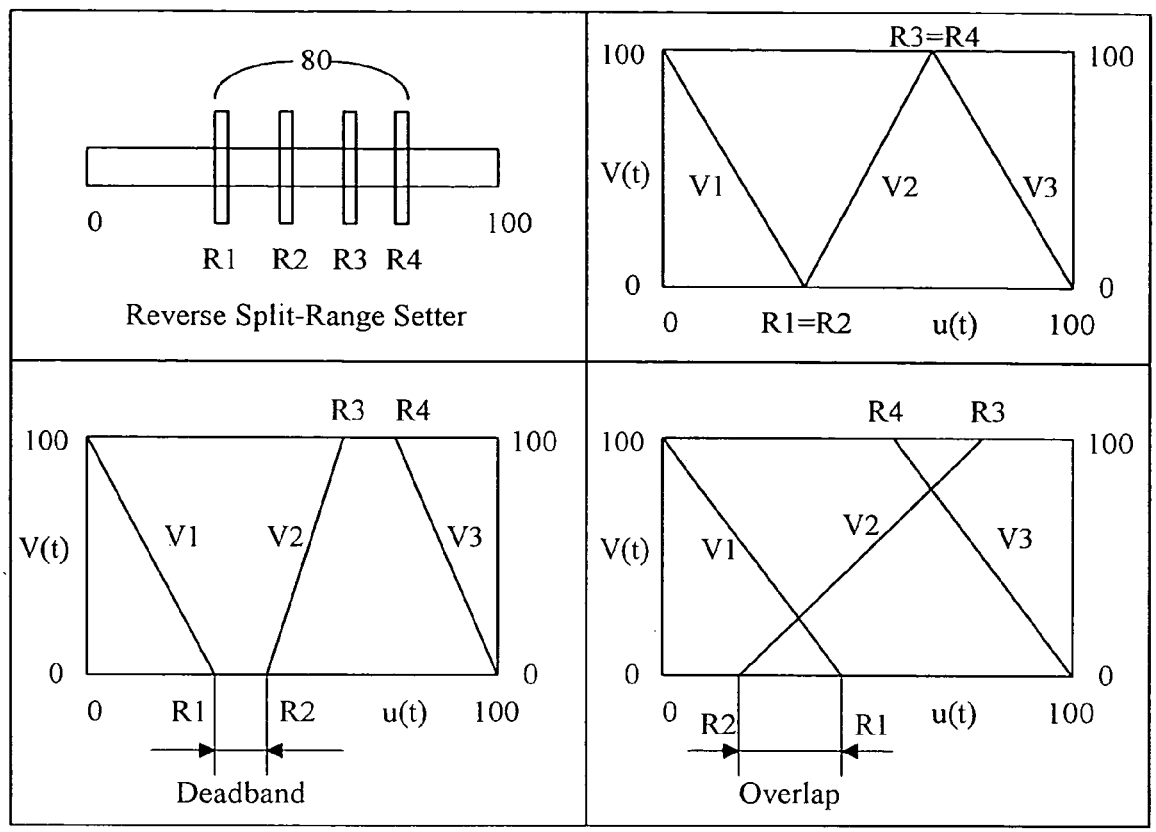
FIG. 9 is a drawing illustrating a mechanism of a reverse split-range setter that can easily split a single controller output into 3 or more ranges to manipulate 3 different actuators individually, simultaneously, or not at all.

FIG. 9 illustrates a reverse split-range setter that splits the controller signal u(t) into 3 or more ranges to manipulate 3 different actuators individually, simultaneously, or not at all by moving and setting the knobs $R_1$, $R_2$, $R_3$ and $R_4$ 80, respectively. Using the similar technique, we can easily expand the 1×2 case to the 1×3 case. The controller outputs $V_1(t)$, $V_2(t)$ and $V_3(t)$ are calculated based on the following formulas:

$$E_1 = \frac{K_{c1}}{T_{c1}} N(e(t)), \quad \text{for all } u(t) \in [0, R_1] \quad (27a)$$

$$u(t) = K_{c1}e(t) + 100\left[a\sum_{j=1}^{N} h_j(n)q_j(n) + b\right], \quad \text{for all } u(t) \in [0, R_1] \quad (27b)$$

$$V_1(t) = -100\frac{u(t)}{R_1} + 100, \quad \text{for all } u(t) \in [0, R_1] \quad (27c)$$

$$V_1(t) = 0, \quad \text{for all } u(t) \in (R_1, 100] \quad (27d)$$

where $0 < R_1 \leq 100$, which defines the split range of u(t) for controller output $V_1(t)$;

$$E_1 = \frac{K_{c2}}{T_{c2}} N(e(t)), \quad \text{for all } u(t) \in [R_2, R_3] \quad (28a)$$

$$u(t) = K_{c2}e(t) + 100\left[a\sum_{j=1}^{N} h_j(n)q_j(n) + b\right], \quad \text{for all } u(t) \in [R_2, R_3] \quad (28b)$$

$$V_2(t) = -100\frac{u(t) - R_3}{R_2 - R_3} + 100, \quad \text{for all } u(t) \in [R_2, R_3] \quad (28c)$$

$$V_2(t) = 0, \quad \text{for all } u(t) \in [0, R_2) \quad (28d)$$

$$V_2(t) = 100, \quad \text{for all } u(t) \in (R_3, 100] \quad (28e)$$

where $0 \leq R_2 < 100$, $0 < R_3 \leq 100$, and $R_2 < R_3$, which define the split range of u(t) for controller output $V_2(t)$; and $$E_1 = \frac{K_{c3}}{T_{c3}} N(e(t)), \quad \text{for all } u(t) \in [R_4, 100] \quad (29a)$$

$$u(t) = K_{c3}e(t) + 100\left[a\sum_{j=1}^{N} h_j(n)q_j(n) + b\right], \quad \text{for all } u(t) \in [R_4, 100] \quad (29b)$$

$$V_3(t) = -100\frac{u(t) - R_4}{100 - R_4} + 100, \quad \text{for all } u(t) \in [R_4, 100] \quad (29c)$$

$$V_3(t) = 100, \quad \text{for all } u(t) \in [0, R_4) \quad (29d)$$

where $0 \leq R_4 < 100$, which defines the split range of u(t) for controller output $V_3(t)$.

The signals u(t), $V_1(t)$, $V_2(t)$, and $V_3(t)$ all have a working range of 0% to 100%. We can easily rescale each of the output signals $V_1(t)$, $V_2(t)$, and $V_3(t)$ from its 0% to 100% range to an engineering value range by using a linear function. In addition, control limits and constraints can be applied to these signals for safety or other reasons to limit the control actions.

To simplify, the treatment on the controller parameters as described in Equations (15) and (16) for rescaled controller gain, and in Equations (19) and (20) for averaged controller gain and time constant are not presented here but can be implemented similarly.

Figure 10:
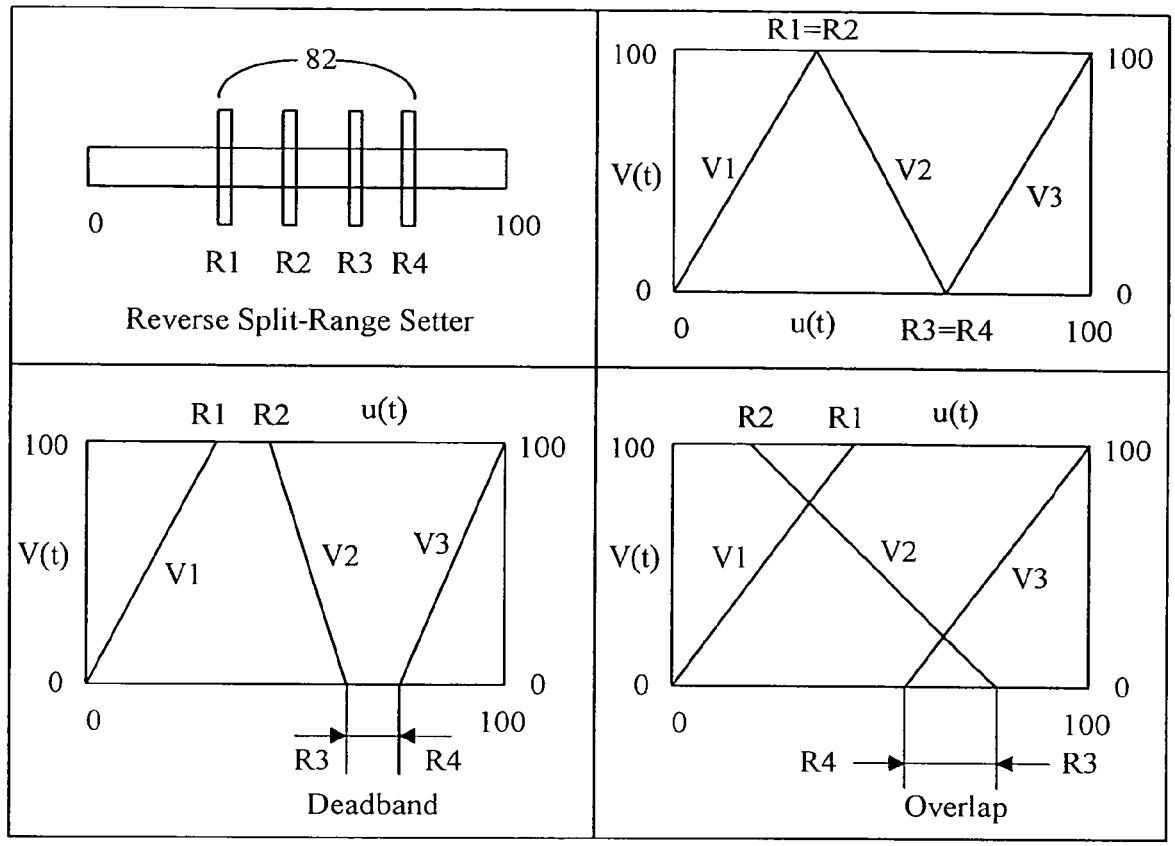
FIG. 10 is a drawing illustrating a mechanism of a reverse split-range setter that is an alternative design to split a single controller output into 3 or more ranges to manipulate 3 different actuators individually, simultaneously, or not at all.

FIG. 10 illustrates an alternative design for the reverse split-range setter that splits the controller signal u(t) into 3 or more ranges to manipulate 3 different actuators individually, simultaneously, or not at all by moving and setting the knobs $R_1$, $R_2$, $R_3$ and $R_4$ 82, respectively. Using the similar technique, we can easily expand the 1×2 case to the 1×3 case. The controller outputs V1(t), $V_2(t)$ and $V_3(t)$ are calculated based on the following formulas:

$$V_1(t) = 100\frac{u(t) - R_1}{R_1} + 100, \quad \text{for all } u(t) \in [0, R_1] \quad (30a)$$

$$V_1(t) = 100, \quad \text{for all } u(t) \in (R_1, 100] \quad (30b)$$

where $0<R_1 \leq 100$, which defines the split range of u(t) for controller output $V_1(t)$;

$$V_2(t) = -100\frac{u(t) - R_2}{R_3 - R_2} + 100, \quad \text{for all } u(t) \in [R_2, R_3] \quad (31a)$$

$$V_2(t) = 100, \quad \text{for all } u(t) \in [0, R_2) \quad (31b)$$

$$V_2(t) = 0, \quad \text{for all } u(t) \in (R_3, 100] \quad (31c)$$

where $0 \leq R_2 < 100$, $0 < R_3 \leq 100$, and $R_2 < R_3$, which define the split range of u(t) for controller output $V_2(t)$; and $$V_3(t) = -100\frac{u(t) - 100}{R_4 - 100} + 100, \quad \text{for all } u(t) \in [R_4, 100] \quad (32a)$$

$$V_3(t) = 0, \quad \text{for all } u(t) \in [0, R_4) \quad (32b)$$

where $0 \leq R_4 < 100$ which defines the split range of u(t) for controller output $V_3(t)$. In these equations, u(t) is calculated based on the Equations (27a), (27b), (28a), (28b), (29a) and (29b), respectively.

The signals u(t), $V_1(t)$, $V_2(t)$, and $V_3(t)$ all have a working range of 0% to 100%. We can easily rescale each of the output signals $V_1(t)$, $V_2(t)$, and $V_3(t)$ from its 0% to 100% range to an engineering value range by using, a linear function. In addition, control limits and constraints can be applied to these signals for safety or other reasons to limit the control actions. This reverse split-range setter design is useful for situations where valves are wide open at 100% during their off position.

Figure 11:
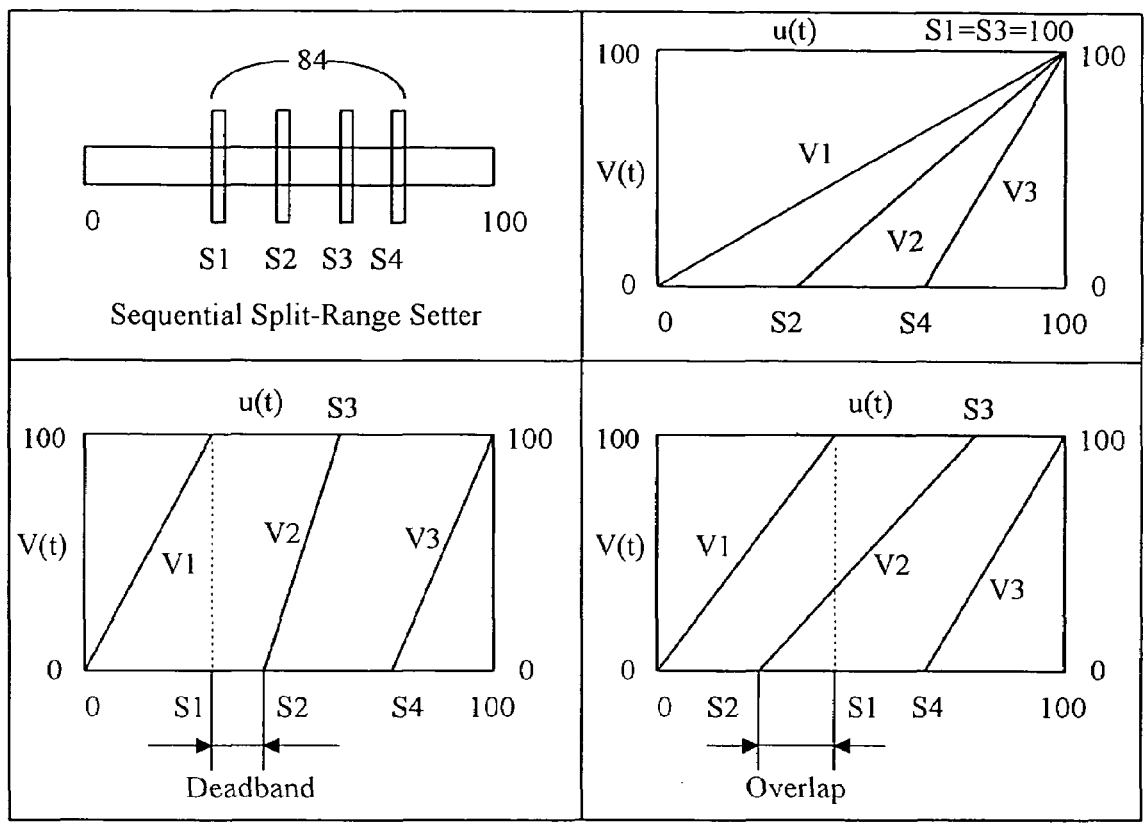
FIG. 11 is a drawing illustrating a mechanism of a sequential split-range setter that can convert a single controller output into 3 or more ranges to manipulate 3 different actuators individually, simultaneously, or not at all.

FIG. 11 illustrates a sequential split-range setter that converts the controller signal u(t) into 3 or more ranges to manipulate 3 different actuators individually, simultaneously, or neither by moving and setting the knobs $S_1$ to $S_4$ 84, respectively.

The controller outputs $V_1(t)$, $V_2(t)$, and $V_3(t)$ are calculated based on the following formulas as implemented in the split-range setter mechanism 74:

$$V_1(t) = 100\frac{u(t) - S_1}{S_1} + 100, \quad \text{for all } u(t) \in [0, S_1] \quad (33a)$$

$$V_1(t) = 100, \quad \text{for all } u(t) \in (S_1, 100] \quad (33b)$$

where $0 < S_1 \leq 100$, which defines the split range of u(t) for controller output $V_1(t)$;

$$V_2(t) = -100\frac{u(t) - S_3}{S_2 - S_3} + 100, \quad \text{for all } u(t) \in [S_2, S_3] \quad (34a)$$

$$V_2(t) = 0, \quad \text{for all } u(t) \in [0, S_2) \quad (34b)$$

$$V_2(t) = 100, \quad \text{for all } u(t) \in (S_3, 100] \quad (34c)$$

where $0 \leq S_1 < 100$, $0 < S_3 \leq 100$, and $S_{2 < S3}$, which define the split range of u(t) for controller output $V_2(t)$; and $$V_3(t) = -100\frac{u(t) - 100}{S_4 - 100} + 100, \quad \text{for all } u(t) \in [S_4, 100] \quad (35a)$$

$$V_3(t) = 0, \quad \text{for all } u(t) \in [0, S_4) \quad (35b)$$

where $0 \leq S_4 < 100$, which defines the split range of u(t) for controller output $V_3(t)$. The signals u(t), $V_1(t)$, $V_2(t)$, and $V_3(t)$ all have a working rang(e of 0% to 100%. In this design, the control valves are shut at 0% during their off position.

Figure 12:
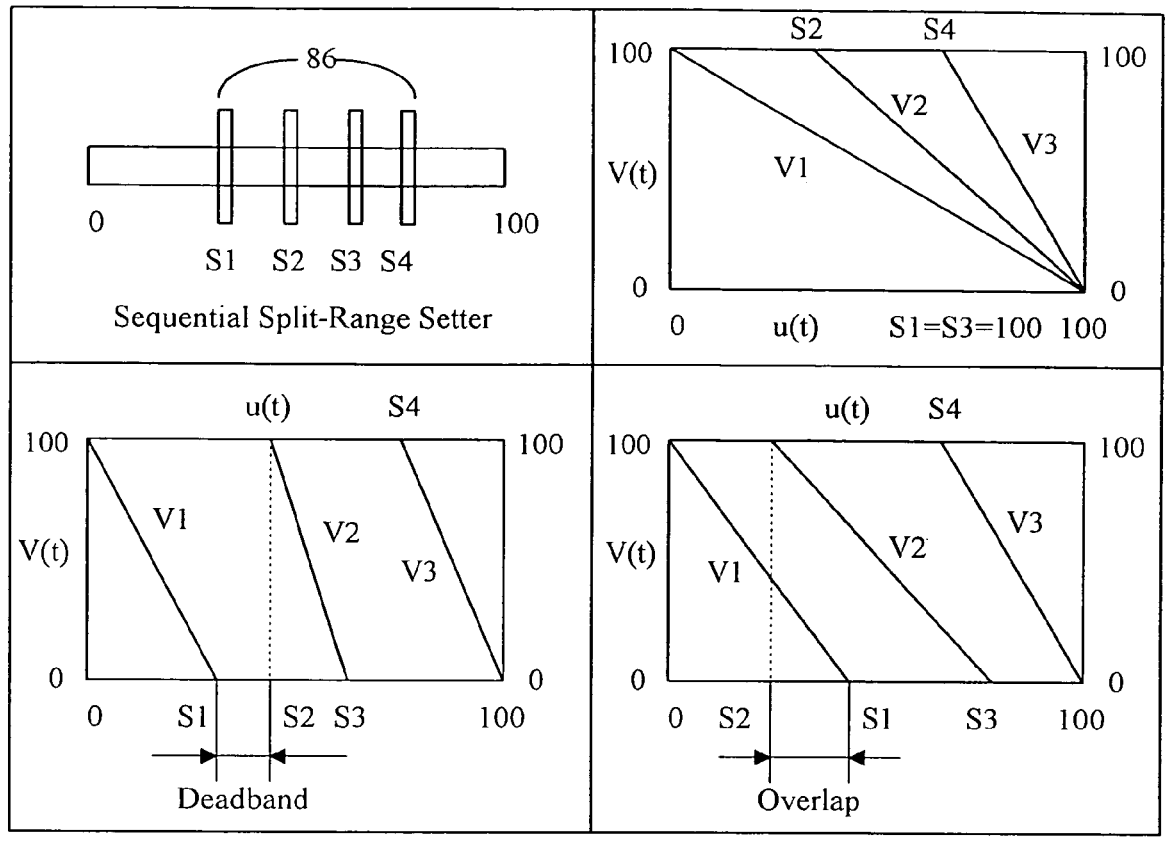
FIG. 12 is a drawing illustrating a mechanism or a sequential split-range setter that is an alternative design to convert a single controller output into 3 or more ranges to manipulate 3 different actuators individually, simultaneously, or not at all.

FIG. 12 illustrates an alternative design of the sequential split-range setter that converts the controller signal u(t) into 3 or more ranges to manipulate 3 different actuators individually, simultaneously, or neither by moving and setting the knobs $S_1$ to $S_4$ 86, respectively.

The controller outputs $V_1(t)$, $V_2(t)$, and $V_3(t)$ are calculated based on the following formulas as implemented in the split-range setter mechanism 74:

$$V_1(t) = -100\frac{u(t)}{S_1} + 100, \quad \text{for all } u(t) \in [0, S_1] \quad (36a)$$

$$V_1(t) = 0, \quad \text{for all } u(t) \in (S_1, 100] \quad (36b)$$

where $0 < S_1 \leq 100$, which defines the split range of u(t) for controller output $V_1(t)$.

$$V_2(t) = -100\frac{u(t) - S_2}{S_3 - S_2} + 100, \quad \text{for all } u(t) \in [S_2, S_3] \quad (37a)$$

$$V_2(t) = 100, \quad \text{for all } u(t) \in [0, S_2) \quad (37b)$$

$$V_2(t) = 0, \quad \text{for all } u(t) \in (S_3, 100] \quad (37c)$$

where $0 \leq S_2 < 100$, $0 < S_3 \leq 100$, and $S_2 < S_3$, which define the split range of u(t) for controller output $V_2(t)$; and $$V_3(t) = -100\frac{u(t) - S_4}{100 - S_4} + 100, \quad \text{for all } u(t) \in [S_4, 100] \quad (38a)$$

$$V_3(t) = 100, \quad \text{for all } u(t) \in [0, S_4) \quad (38b)$$

where $0 \leq S_4 < 100$, which defines the split range of u(t) for controller output $V_3(t)$. In these equations, u(t) is calculated based on the Equations (27a), (27b), (28a), (28b), (29a) and (29b), respectively.

The signals u(t), $V_1(t)$, $V_2(t)$, and $V_3(t)$ all have a working range of 0% to 100%. We can easily rescale each of the output signals $V_1(t)$, $V_2(t)$, and $V_3(t)$ from its 0% to 100% range to an engineering value range by using a linear function. In addition, control limits and constraints can be applied to these signals for safety or other reasons to limit the control actions. This sequential split-range setter design is useful for situations where valves are wide open at 100% during their off position.

C. Single-Input-Multi-Output Model-Free Adaptive Controller

Figure 13:
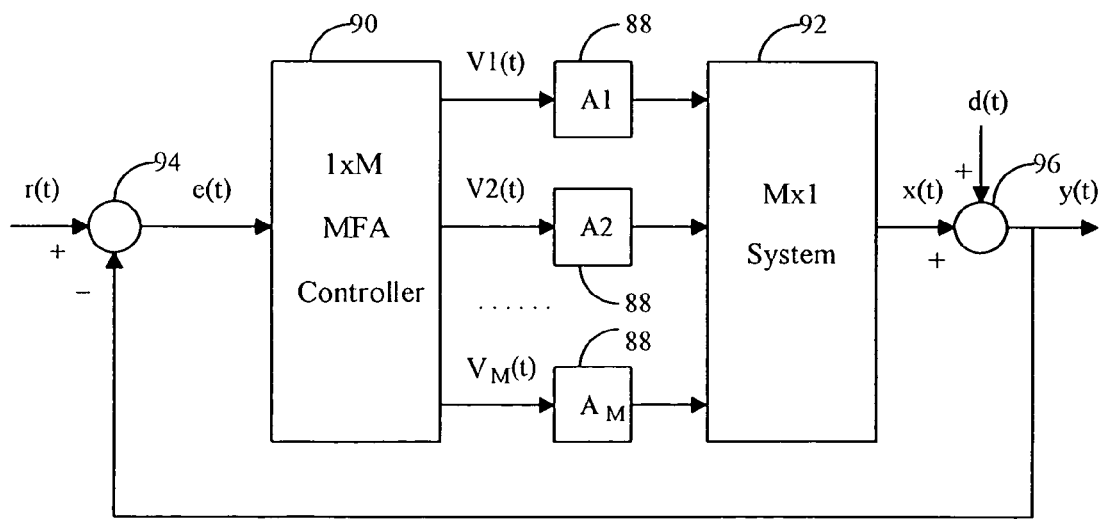
FIG. 13 is a block diagram illustrating a 1-input-M-output (1×M) model-free adaptive (MFA) controller that controls an M-input-1-output (M×1) system.

FIG. 13 illustrates a 1-input-M-output (1×M) MFA controller that controls an M-input-1-output (M×1) system. The control system consists of a 1-input-M-output (1×M) MFA controller 90, an M-input-1-output (M×1) system 92, actuators $A_1$ through $A_M$ 88, and signal adders, 94, 96. The signals shown in FIG. 13 are as follows:

r(t)—Setpoint.

y(t)—Measured Variable or the Process Variable, y(t)=x(t)+d(t).

x(t)—System Output.

$V_1(t)$—Controller Output 1 to manipulate Actuator $A_1$.

$V_2(t)$—Controller Output 2 to manipulate Actuator $A_2$.

. . .

$V_M(t)$—Controller Output M to manipulate Actuator $A_M$.

d(t)—Disturbance, the disturbance caused by noise or load changes.

e(t)—Error between the Setpoint and Measured Variable, e(t)=r(t)−y(t).

The control objective is for the controller to produce outputs $V_1(t), V_2(t), \ldots, V_M(t)$ to manipulate actuators $A_1, A_2, \ldots, A_M$ so that the measured variable y(t) tracks the given trajectory of its setpoint r(t) under variations of setpoint, disturbance, and process dynamics.

Figure 14:
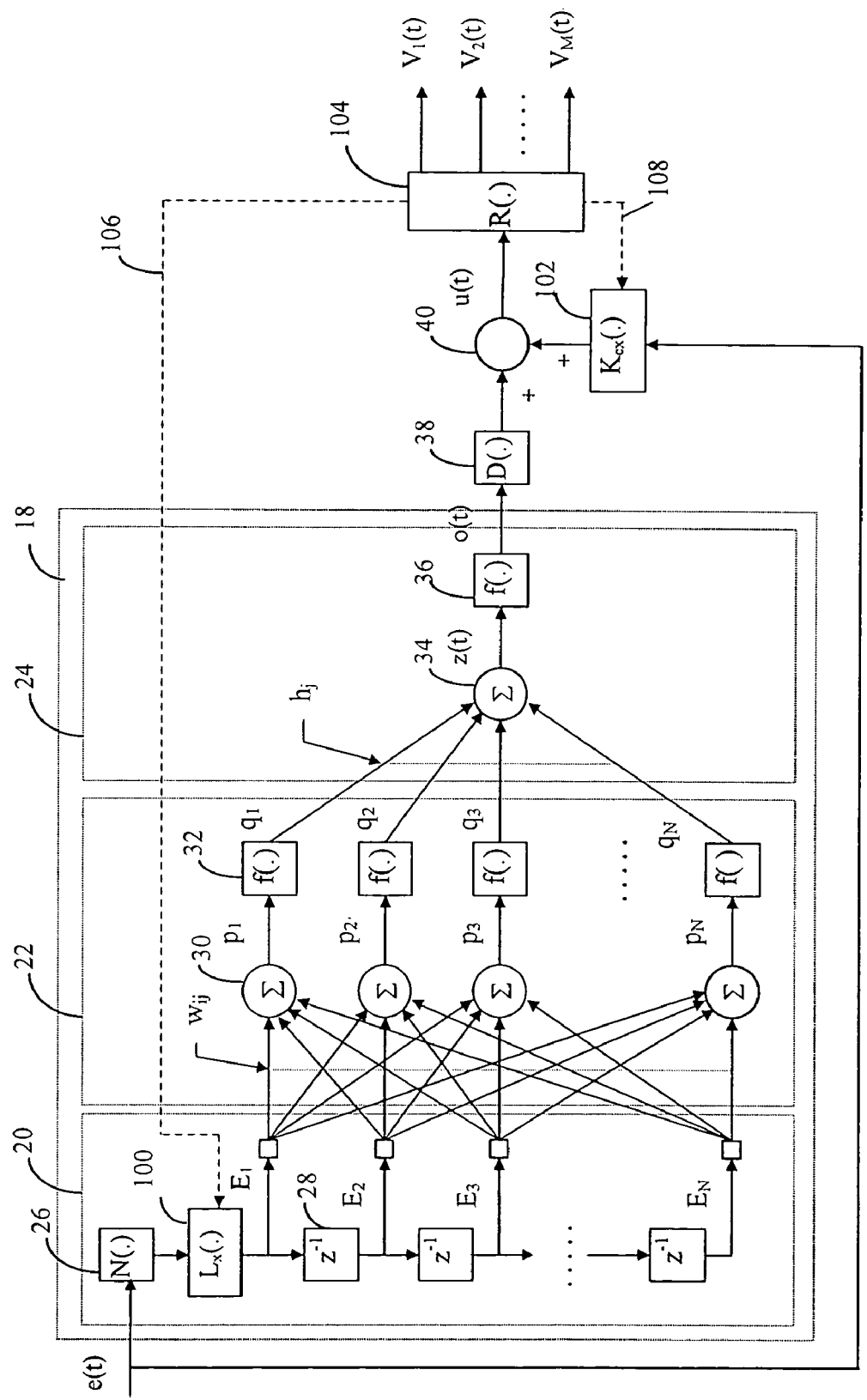
FIG. 14 is a block diagram illustrating the architecture of a 1-input-M-output (1×M) model-free adaptive (MFA) controller.

FIG. 14 illustrates the architecture of a 1-input-M-output MFA controller. The elements 18 through 40 are the same as described for the 1-Input-2-Output MFA controller. The controller signal u(t) goes into a split-range setter R(·) 104 to produce the controller outputs $V_1(t), V_2(t), \ldots, V_1M(t)$. The information inside the split-range setter R(·) is routed through signal lines 106 and 108 to elements $L_x(\cdot)$ 100 and $K_{cx}(\cdot)$ 102, respectively. Based on this design, the user can enter N4 sets of controller gains. $K_{c1}, K_{c2}, \ldots, K_{cM}$ and time constants $T_{c1}, T_{c2}, T_{cM}$ when configuring the controller. These are estimated controller gains and process time constants relating to the dynamics of the sub-systems between the manipulated variables $V_1(t), V_2(t), \ldots, V_M(t)$ to the controlled process variable y(t), respectively.

Using the similar technique, we can expand the 1×3 case to the 1×M case. The reverse split-range setter similar to what is illustrated in FIG. 9 is used to split the controller signal u(t); and the controller outputs $V_1(t)$ and $V_2(t)$ are calculated based on the following formulas:

$$E_1 = \frac{K_{c1}}{T_{c1}} N(e(t)), \quad \text{for all } u(t) \in [0, R_1] \quad (39a)$$

$$u(t) = K_{c1}e(t) + 100\left[a\sum_{j=1}^{N} h_j(n)q_j(n) + b\right], \quad \text{for all } u(t) \in [0, R_1] \quad (39b)$$

$$V_1(t) = -100\frac{u(t)}{R_1} + 100, \quad \text{for all } u(t) \in [0, R_1] \quad (39c)$$

$$V_1(t) = 0, \quad \text{for all } u(t) \in (R_1, 100] \quad (39d)$$

where $0 < R_1 \leq 100$, which defines the split range of u(t) for controller output $V_1(t)$;

$$E_1 = \frac{K_{c2}}{T_{c2}} N(e(t)), \quad \text{for all } u(t) \in [R_2, R_3] \quad (40a)$$

$$u(t) = K_{c2}e(t) + 100\left[a\sum_{i=1}^{N} h_j(n)q_j(n) + b\right], \quad \text{for all } u(t) \in [R_2, R_3] \quad (40b)$$

$$V_2(t) = -100\frac{u(t) - R_3}{R_2 - R_3} + 100, \quad \text{for all } u(t) \in [R_2, R_3] \quad (40c)$$

$$V_2(t) = 0, \quad \text{for all } u(t) \in [0, R_2) \quad (40d)$$

$$V_2(t) = 100, \quad \text{for all } u(t) \in [R_3, 100] \quad (40e)$$

where $0 \leq R_2 < 100$, $0 < R_3 \leq 100$, and $R_2 < R_3$ which define the split range of u(t) for controller output $V_2(t)$; . . . ;

Without losing generality, the last control signal $V_M(t)$ can be calculated based on the following, formulas:

$$E_1 = \frac{K_{cM}}{T_{cM}} N(e(t)). \quad \text{for all } u(t) \in [R_{2M-2}, 100] \quad (41a)$$

$$u(t) = K_{cM}e(t) + 100\left[a\sum_{j=1}^{N} h_j(n)q_j(n) + b\right], \quad \text{for all } u(t) \in [R_{2M-2}, 100] \quad (41b)$$

where M = 3, 4, 5, 6 ... ;

$$V_M(t) = -100\frac{u(t) - R_{2M-2}}{100 - R_{2M-2}} + 100, \quad \text{for all } u(t) \in [R_{2M-2}, 100] \quad (41c)$$

$$V_M(t) = 100, \quad \text{for all } u(t) \in [0, R_{2M-2}) \quad (41d)$$

where M=3, 5, 7, . . . ; and $0 \leq R_{2M-2} < 100$ which defines the Split range of I1(t) for controller output $V_M(t)$; and $$V_M(t) = -100\frac{u(t) - 100}{R_{2M-2} - 100} + 100, \quad \text{for all } u(t) \in [R_{2M-2}, 100] \quad (41e)$$

$$V_M(t) = 0, \quad \text{for all } u(t) \in [0, R_{2M-2}) \quad (41f)$$

where M=4, 6, 8, . . . ; and $0 \leq R_{2M-2} < 100$ which defines the split range of u(t) for controller Output $V_M(t)$.

The signals u(t), $V_1(t), V_2(t), \ldots, V_M(t)$ all have a working range of 0% to 100%. We can easily rescale each of the output signals $V_1(t), V_2(t),$ and $V_3(t)$ from its 0% to 100% range to an engineering value range by using a linear function. In addition, control limits and constraints can be applied to these signals for safety or other reasons to limit the control actions. To simplify, the treatment on the controller parameters as described in Equations (15), (16), (19), and (20) are not presented here but can be implemented similarly. The alternative design for the reverse split-range setter similar to what is illustrated in FIG. 10 can also be derived.

A sequential split-range setter similar to what is illustrated in FIG. 11 is used; and the controller outputs $V_1(t)$ and $V_2(t)$ are calculated based on the following formulas:

$$E_1 = \frac{K_{c1}}{T_{c1}} N(e(t)), \quad \text{for all } u(t) \in [0, S_1] \quad (42a)$$

-continued $$u(t) = K_{c1}e(t) + 100\left[a\sum_{j=1}^{N}h_j(n)q_j(n) + b\right], \quad \text{for all } u(t) \in [0, S_1] \quad (42b)$$

$$V_1(t) = 100\frac{u(t) - S_1}{S_1} + 100, \quad \text{for all } u(t) \in [0, S_1] \quad (42c)$$

$$V_1(t) = 100, \quad \text{for all } u(t) \in (S_1, 100] \quad (42d)$$

where $0 < S_1 \leq 100$, which defines the split range of u(t) for controller output $V_1(t)$;

$$E_1 = \frac{K_{c2}}{T_{c2}}N(e(t)), \quad \text{for all } u(t) \in [S_2, S_3] \quad (43a)$$

$$u(t) = K_{c2}e(t) + 100\left[a\sum_{j=1}^{N}h_j(n)q_j(n) + b\right], \quad \text{for all } u(t) \in [S_2, S_3] \quad (43b)$$

$$V_2(t) = -100\frac{u(t) - S_3}{S_2 - S_3} + 100, \quad \text{for all } u(t) \in [S_2, S_3] \quad (43c)$$

$$V_2(t) = 0, \quad \text{for all } u(t) \in [0, S_2) \quad (43d)$$

$$V_2(t) = 100, \quad \text{for all } u(t) \in [S_3, 100] \quad (43e)$$

where $0 \leq S_2 < 100$, $0 < S_3 \leq 100$, and $S_2 < S_3$ which define the split range of u(t) for controller output $V_2(t)$; . . . ;

Without losing generality, the last control signal $V_M(t)$ can be calculated based on the following formulas:

$$E_1 = \frac{K_{cM}}{T_{cM}}N(e(t)), \quad \text{for all } u(t) \in [S_{2M-2}, 100] \quad (44a)$$

$$u(t) = K_{cM}e(t) + 100\left[a\sum_{j=1}^{N}h_j(n)q_j(n) + b\right], \quad \text{for all } u(t) \in [S_{2M-2}, 100] \quad (44b)$$

$$V_M(t) = -100\frac{u(t) - 100}{S_{2M-2} - 100} + 100, \quad \text{for all } u(t) \in [S_{2M-2}, 100] \quad (44c)$$

$$V_M(t) = 0, \quad \text{for all } u(t) \in [0, S_{2M-2}) \quad (44d)$$

where M=3, 4, 5, 6, . . . ; and $0 \leq S_{2M-2} < 100$ which defines the split range of u(t) for controller output $V_M(t)$.

The signals u(t), $V_1(t)$, $V_2(t)$, . . . , $V_M(t)$ all have a working range of 0% to 100%. Controller parameters $K_{c1}$, $K_{c2}$, . . . , $K_{cM}$, $T_{c1}$, $T_{c2}$, . . . , $T_{cM}$ are entered by the user during controller configuration. These are estimated controller gains and process time constants relating to the dynamics of the sub-systems between the manipulated variables $V_1(t)$, $V_2(t)$, . . . , $V_M(t)$ to the controlled process variable y(t), respectively. To simplify, the treatment on the controller parameters as described in Equations (15), (16), (19), and (20) are not presented here but can be implemented similarly. The alternative design for the sequential split-range setter similar to what is illustrated in FIG. 12 can also be derived.

D. 1-Input-2-Output PID Controller

Figure 15:
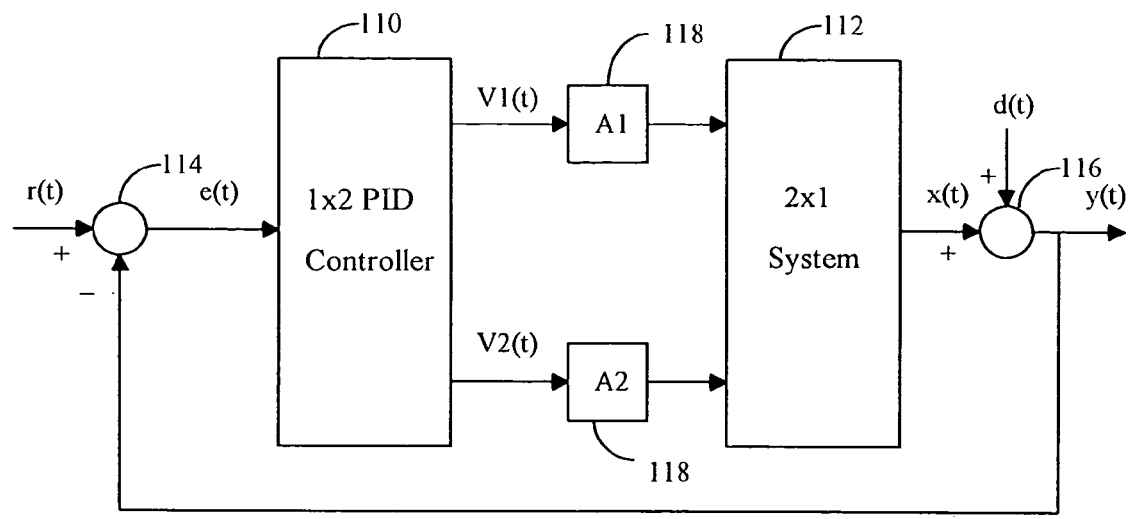
FIG. 15 is a block diagram illustrating a 1-input-2-output (1×2) proportional-integral-derivative (PID) controller that controls a 2-input-1-output (2×1) system.

FIG. 15 illustrates a 1-input-2-output (1×2) Proportional-Integral-Derivative controller that controls a 2-input-1-output (2×1) system. The control system consists of a 1-input-2-output (1×2) PID controller 110, a 2-input-1-output (2×1) system 112, actuators $A_1$ and $A_2$ 118, and signal adders, 114, 116. The signals shown in FIG. 15 are as follows:

r(t)—Setpoint.

y(t)—Measured Variable or the Process Variable, y(t)=x(t)+d(t).

x(t)—System Output.

$V_1(t)$—Controller Output 1 to manipulate Actuator $A_1$.

$V_2(t)$—Controller Output 2 to manipulate Actuator $A_2$.

d(t)—Disturbance, the disturbance caused by noise or load changes.

e(t)—Error between the Setpoint and Measured Variable, e(t)=r(t)−y(t).

The control objective is for the controller to produce outputs $V_1(t)$ and $V_2(t)$ to manipulate actuators $A_1$ and $A_2$ so that the measured variable y(t) tracks the given trajectory of its setpoint r(t).

The standard PID algorithm has the following form:

$$u(t) = K_p\left\{e(t) + \frac{1}{T_i}\int e(t)dt + T_d\frac{de(t)}{dt}\right\}, \quad (45)$$

where $K_p$ is the Proportional Gain, $T_i$ is the Integral Time in second/repeat, and $T_d$ is the Derivative Time in repeat/second.

The reverse split-range setter described in FIG. 3 is readily useful to convert a SISO PID controller into a 1-input-2-output PID controller. The reverse split-range setter splits the controller signal u(t) into 2 or more ranges to manipulate 2 different actuators individually, simultaneously, or neither by moving and setting the knobs $R_1$ and $R_2$ 50, respectively.

Based on the similar design procedure, we can allow the user to enter 2 sets of PID parameters $K_{p1}$, $K_{p2}$, $T_{i1}$, $T_{i2}$, $T_{d1}$, $T_{d2}$ for calculating controller outputs $V_1(t)$ and $V_2(t)$.

To compensate for the static gain changes caused by the split-range setting of $R_1$ and $R_2$, we can re-scale the controller gains based on the following formulas:

$$K_{p1} = K_1\frac{R_1}{100}, \quad (46)$$

$$K_{p2} = K_2\frac{100 - R_2}{100}, \quad (47)$$

where $K_1$ and $K_2$ are configured controller gains of PID for $V_1(t)$ and $V_2(t)$, respectively.

The 1×2 PID controller outputs $V_1(t)$ and $V_2(t)$ are calculated based on the following formulas:

$$u(t) = K_{p1}\left\{e(t) + \frac{1}{T_{i1}}\int e(t)dt + T_{d1}\frac{de(t)}{dt}\right\}, \quad \text{for all } u(t) \in [0, R_1] \quad (48a)$$

$$V_1(t) = -100\frac{u(t)}{R_1} + 100, \quad \text{for all } u(t) \in [0, R_1] \quad (48b)$$

-continued $$V_1(t) = 0, \quad \text{for all } u(t) \in (R_1, 100] \quad (48c)$$

where $0 < R_1 \leq 100$, which defines the split range of u(t) for controller output $V_1(t)$; and $$u(t) = K_{p2}\left\{e(t) + \frac{1}{T_{i2}}\int e(t)dt + T_{d2}\frac{de(t)}{dt}\right\}, \quad \text{for all } u(t) \in [R_2, 100] \quad (49a)$$

$$V_2(t) = -100\frac{u(t) - 100}{R_2 - 100} + 100, \quad \text{for all } u(t) \in [R_2, 100] \quad (49b)$$

$$V_2(t) = 0, \quad \text{for all } u(t) \in [0, R_2). \quad (49c)$$

where $0 \leq R_2 < 100$, which defines the split range of u(t) for controller output $V_2(t)$. The signals u(t), $V_1(t)$, and $V_2(t)$ all have a working range of 0% to 100%. In this design, the control valves are shut at 0% during their off position. We can move and set the $R_1$ and $R_2$ knobs freely within its (0, 100) range to produce controller outputs $V_1(t)$, and $V_2(t)$, where there may be a deadband, or an overlap, or no gaps in between. These 3 types of settings are all useful depending on the actuators and actual applications.

For the two special cases, when $R_1 > R_2$ and u(t) is inside the signal overlap area; and when $R_1 < R_2$ and u(t) is inside the deadband, we can simply let $$K_p = \frac{K_{p1} + K_{p2}}{2},$$

for u(t) inside deadband or overlap area (50a)

$$T_i = \frac{T_{i1} + T_{i2}}{2}, \quad \text{for } u(t) \text{ inside deadband or overlap area} \quad (50b)$$

$$T_d = \frac{T_{d1} + T_{d2}}{2}, \quad \text{for } u(t) \text{ inside deadband or overlap area} \quad (50c)$$

and then calculate u(t) based on Equation (45) using the averaged PID parameters.

The alternative design of the reverse split-range setter illustrated in FIG. 4 can also be applied to the PID controller, where $V_1(t)$ starts from 0 instead of 100 and $V_2(t)$ ends at 0 instead of 100. It splits the controller signal u(t) into 2 or more ranges to manipulate 2 different actuators individually, simultaneously, or neither by moving and setting the knobs $R_1$ and $R_2$ 52, respectively. The controller outputs $V_1(t)$ and $V_2(t)$ are calculated based on the following formulas:

$$u(t) = K_{p1}\left\{e(t) + \frac{1}{T_{i1}}\int e(t)dt + T_{d1}\frac{de(t)}{dt}\right\}, \quad \text{for all } u(t) \in [0, R_1] \quad (51a)$$

$$V_1(t) = 100\frac{u(t) - R_1}{R_1} + 100, \quad \text{for all } u(t) \in [0, R_1] \quad (51b)$$

$$V_1(t) = 100, \quad \text{for all } u(t) \in (R_1, 100] \quad (52c)$$

where $0 < R_1 \leq 100$, which defines the split range of u(t) for controller output $V_1(t)$; and $$u(t) = K_{p2}\left\{e(t) + \frac{1}{T_{i2}}\int e(t)dt + T_{d2}\frac{de(t)}{dt}\right\}, \quad \text{for all } u(t) \in [R_2, 100] \quad (52a)$$

$$V_2(t) = -100\frac{u(t) - R_2}{100 - R_2} + 100, \quad \text{for all } u(t) \in [R_2, 100] \quad (52b)$$

$$V_2(t) = 100, \quad \text{for all } u(t) \in [0, R_2) \quad (52c)$$

where $0 \leq R_1 < 100$, which defines the split range of u(t) for controller output $V_2(t)$.

The signals u(t), $V_1(t)$, and $V_2(t)$ all have a working range of 0% to 100%. This reverse split-range setter design is useful for situations where valves are wide open at 100% during their off position.

The sequential split-range setter as illustrated in FIG. 5 can be applied to the PID case that converts the controller signal u(t) into 2 or more ranges to manipulate 2 different actuators individually, simultaneously, or neither by moving and setting the knobs $S_1$ and $S_2$ 54, respectively.

The controller outputs $V_1(t)$ and $V_2(t)$ are calculated based on the following formulas:

$$u(t) = K_{p1}\left\{e(t) + \frac{1}{T_{i1}}\int e(t)dt + T_{d1}\frac{de(t)}{dt}\right\}, \quad \text{for all } u(t) \in [0, S_1] \quad (53a)$$

$$V_1(t) = 100\frac{u(t) - S_1}{S_1} + 100, \quad \text{for all } u(t) \in [0, S_1] \quad (53b)$$

$$V_1(t) = 100, \quad \text{for all } u(t) \in (S_1, 100] \quad (53c)$$

where $0 < S_1 \leq 100$, which defines the split range of u(t) for controller output $V_1(t)$; and $$u(t) = K_{p2}\left\{e(t) + \frac{1}{T_{i2}}\int e(t)dt + T_{d2}\frac{de(t)}{dt}\right\}, \quad \text{for all } u(t) \in [S_2, 100] \quad (54a)$$

$$V_2(t) = -100\frac{u(t) - 100}{S_2 - 100} + 100, \quad \text{for all } u(t) \in [S_2, 100] \quad (54b)$$

$$V_2(t) = 0, \quad \text{for all } u(t) \in [0, S_2) \quad (54c)$$

where $0 \leq S_2 < 100$, which defines the split range of u(t) for controller output $V_2(t)$. The signals u(t), $V_1(t)$, and $V_2(t)$ all have a working range of 0% to 100%. In this design, the control valves are shut at 0% during their off position.

The alternative design of the sequential split-range setter as illustrated in FIG. 6 can also be applied to the PID case, where $V_1(t)$ and $V_2(t)$ start from 100 instead of 0. It converts the controller signal u(t) into 2 or more ranges to manipulate 2 different actuators individually, simultaneously, or neither by moving and setting the knobs $S_1$ and $S_2$ 56, respectively. The controller outputs $V_1(t)$ and $V_2(t)$ are calculated based on the following formulas:

$$u(t) = K_{p1}\left\{e(t) + \frac{1}{T_{i1}}\int e(t)dt + T_{d1}\frac{de(t)}{dt}\right\}, \quad \text{for all } u(t) \in [0, S_1] \quad (55a)$$

$$V_1(t) = -100\frac{u(t)}{S_1} + 100, \quad \text{for all } u(t) \in [0, S_1] \quad (55b)$$

-continued $$V_1(t) = 0, \quad \text{for all } u(t) \in (S_1, 100] \quad (55c)$$

where $0 < S_1 \leq 100$, which defines the split range of u(t) for controller output $V_1(t)$.

$$u(t) = K_{p2}\left\{e(t) + \frac{1}{T_{i2}} \int e(t)dt + T_{d2}\frac{de(t)}{dt}\right\}, \quad \text{for all } u(t) \in [S_2, 100] \quad (56a)$$

$$V_2(t) = -100\frac{u(t) - S_2}{100 - S_2} + 100, \quad \text{for all } u(t) \in [S_2, 100] \quad (56b)$$

$$V_2(t) = 100, \quad \text{for all } u(t) \in [0, S_2) \quad (56c)$$

where $0 \leq S_2 < 100$, which defines the split range of u(t) for controller output $V_2(t)$.

This sequential split-range setter design is useful for situations where valves are wide open at 100% during their off position. The signals u(t), $V_1(t)$, and $V_2(t)$ all have a working range of 0% to 100%. We can easily rescale each of the output signals $V_1(t)$ and $V_2(t)$ from its 0% to 100% range to an engineering value range by using a linear function. In addition, control limits and constraints can be applied to these signals for safety or other reasons to limit the control actions.

Since PID is not an adaptive controller, it may not be able to handle the large dynamic changes within the sub-systems even though the dynamic changes between the sub-systems may be handled by using different sets of PID tuning parameters. Model-Free Adaptive (MFA) controllers will outperform the PIDs because of their adaptive capability.

E. Single-Input-Multi-Output PID Controller

Figure 16:
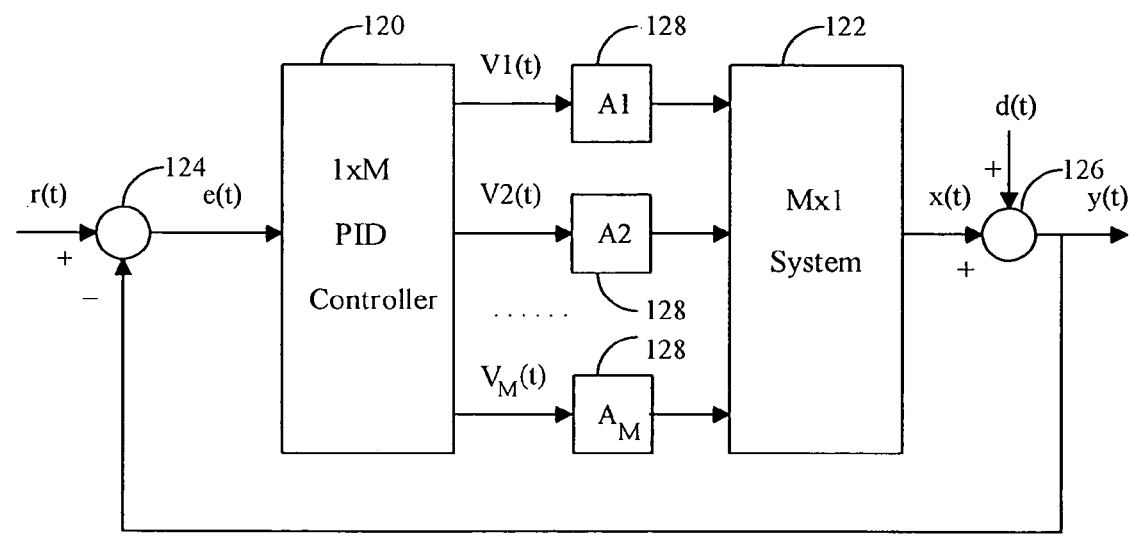
FIG. 16 is a block diagram illustrating a 1-input-M-output (1×M) proportional-integral-derivative (PID) controller that controls an M-input-1-output (M×1) system.

FIG. 16 illustrates a 1-input-M-output (1×M) PID controller that controls an M-input-1-output (M×1) system. The control system consists of a 1-input-M-output (1×M) PID controller 120, an M-input-1-output (M×1) system 122, actuators A1 through $A_M$ 128, and signal adders, 124, 126. The signals shown in FIG. 16 are as follows:

r(t)—Setpoint.

y(t)—Measured Variable or the Process Variable, y(t)=x(t)+d(t).

x(t)—System Output.

$V_1(t)$—Controller Output 1 to manipulate Actuator $A_1$.

$V_2(t)$—Controller Output 2 to manipulate Actuator $A_2$.

. . .

$V_M(t)$—Controller Output M to manipulate Actuator $A_M$.

d(t)—Disturbance, the disturbance caused by noise or load changes.

e(t)—Error between the Setpoint and Measured Variable, e(t)=r(t)−y(t).

The control objective is for the controller to produce outputs $V_1(t), V_2(t), \ldots, V_M(t)$ to manipulate actuators $A_1, A_2, \ldots, A_M$ so that the measured variable y(t) tracks the given trajectory of its setpoint r(t).

Using the similar technique, we can expand the 1×2 case to the 1×M case. When control actions cancel each others a reverse split-range setter similar to what is illustrated in FIG. 9 is used; and the PID controller outputs $V_1(t)$ and $V_2(t)$ are calculated based oil the following formulas:

$$u(t) = K_{p1}\left\{e(t) + \frac{1}{T_{i1}} \int e(t)dt + T_{d1}\frac{de(t)}{dt}\right\}, \quad \text{for all } u(t) \in [0, R_1] \quad (57a)$$

$$V_1(t) = -100\frac{u(t)}{R_1} + 100, \quad \text{for all } u(t) \in [0, R_1] \quad (57b)$$

$$V_1(t) = 0, \quad \text{for all } u(t) \in (R_1, 100] \quad (57c)$$

where $0 < R_1 \leq 100$, which defines the split range of u(t) for controller output $V_1(t)$;

$$u(t) = K_{p2}\left\{e(t) + \frac{1}{T_{i2}} \int e(t)dt + T_{d2}\frac{de(t)}{dt}\right\}, \quad \text{for all } u(t) \in [R_2, R_3] \quad (58a)$$

$$V_2(t) = -100\frac{u(t) - R_3}{R_2 - R_3} + 100, \quad \text{for all } u(t) \in [R_2, R_3] \quad (58b)$$

$$V_2(t) = 0, \quad \text{for all } u(t) \in [0, R_2) \quad (58c)$$

$$V_2(t) = 100, \quad \text{for all } u(t) \in (R_3, 100] \quad (58d)$$

where $0 \leq R_2 < 100$, $0 < R_3 \leq 100$, and $R_2 < R_3$ which define the split range of u(t) for controller output $V_2(t)$; . . . ;

Without losing generality, the last control signal $V_M(t)$ can be calculated based on the following formulas:

$$u(t) = K_{pM}\left\{e(t) + \frac{1}{T_{iM}} \int e(t)dt + T_{dM}\frac{de(t)}{dt}\right\}, \quad (59a)$$

for all $u(t) \in [R_{2M-2}, 100]$ where M=3, 4, 5, 6, . . . ;

$$V_M(t) = -100\frac{u(t) - R_{2M-2}}{100 - R_{2M-2}} + 100, \quad \text{for all } u(t) \in [R_{2M-2}, 100] \quad (59b)$$

$$V_M(t) = 100, \quad \text{for all } u(t) \in [0, R_{2M-2}) \quad (59c)$$

where M=3, 5, 7, . . . ; and $0 \leq R_{2M-2} < 100$ which defines the split range of u(t) for controller output $V_M(t)$; and $$V_M(t) = -100\frac{u(t) - 100}{R_{2M-2} - 100} + 100, \quad \text{for all } u(t) \in [R_{2M-2}, 100] \quad (59d)$$

$$V_M(t) = 0, \quad \text{for all } u(t) \in [0, R_{2M-2}) \quad (59e)$$

where M=4, 6, 8, . . . ; and $0 \leq R_{2M-2} < 100$ which defines the split range of u(t) for controller output $V_M(t)$.

The signals u(t), $V_1(t), V_2(t), \ldots, V_M(t)$ all have a working range of 0% to 100%. Controller parameters $K_{p1}, K_{p2}, \ldots, K_{pM}, T_{i1}, T_{i2}, \ldots, T_{iM}, T_{d1}, T_{d2}, \ldots, T_{dM}$ are entered by the user during controller Configuration. These are the PID tuning parameters suitable for the dynamics of the sub-systems between the manipulated variables $V_1(t), V_2(t), \ldots, V_M(t)$ to the controlled process variable y(t), respectively. To simplify, the treatment on the controller parameters as described in Equations (46), (47), and (50) are not presented here but can be implemented similarly.

When control actions compliment each other, a sequential split-range setter similar to what is illustrated in FIG. 11 is used; and the 1×M PID controller's outputs $V_1(t)$ and $V_2(t)$ are calculated based on the following formulas:

$$u(t) = K_{p1}\left\{e(t) + \frac{1}{T_{i1}}\int e(t)dt + T_{d1}\frac{de(t)}{dt}\right\}, \text{ for all } u(t) \in [0, S_1] \quad (60a)$$

$$V_1(t) = 100\frac{u(t) - S_1}{S_1} + 100, \quad \text{for all } u(t) \in [0, S_1] \quad (60b)$$

$$V_1(t) = 100, \quad \text{for all } u(t) \in (S_1, 100] \quad (60c)$$

where $0 < S_1 \leq 100$, which defines the split range of u(t) for controller output $V_1(t)$;

$$u(t) = K_{p2}\left\{e(t) + \frac{1}{T_{i2}}\int e(t)dt + T_{d2}\frac{de(t)}{dt}\right\}, \text{ for all } u(t) \in [S_2, S_3] \quad (61a)$$

$$V_2(t) = -100\frac{u(t) - S_3}{S_2 - S_3} + 100, \quad \text{for all } u(t) \in [S_2, S_3] \quad (61b)$$

$$V_2(t) = 0, \quad \text{for all } u(t) \in [0, S_2) \quad (61c)$$

$$V_2(t) = 100, \quad \text{for all } u(t) \in (S_3, 100] \quad (61d)$$

where $0 \leq S_2 < 100$, $0 < S_3 \leq 100$, and $S_2 < S_3$ which define the split range of u(t) for controller output $V_2(t)$; . . . ;

Without losing generality, the last PID control signal $V_M(t)$ can be calculated based on the following formulas:

$$u(t) = K_{pM}\left\{e(t) + \frac{1}{T_{iM}}\int e(t)dt + T_{dM}\frac{de(t)}{dt}\right\}, \text{ for all } u(t) \in [S_{2M-2}, 100] \quad (62a)$$

$$V_M(t) = -100\frac{u(t) - 100}{S_{2M-2} - 100} + 100, \text{ for all } u(t) \in [S_{2M-2}, 100] \quad (62b)$$

$$V_M(t) = 0, \quad \text{for all } u(t) \in [0, S_{2M-2}) \quad (62c)$$

where M=3, 4, 5, 6, . . . ; and $0 \leq S_{2M-2} < 100$ which defines the split range of u(t) for controller output $V_M(t)$.

The signals u(t), $V_1(t)$, $V_2(t)$, . . . , $V_M(t)$ all have a working range of 0% to 100%. We can easily rescale each of the output signals $V_1(t)$ and $V_2(t)$ from its 0% to 100% range to an engineering value range by using a linear function. In addition, control limits and constraints can be applied to these signals for safety or other reasons to limit the control actions. Controller parameters $K_{p1}$, $K_{p2}$, . . . , $K_{pM}$, $T_{i1}$, $T_{i2}$, . . . , $T_{iM}$, $T_{d1}$, $T_{d2}$, . . . , $T_{dM}$ are entered by the user during controller configuration.

The alternative design of the reverse split-range setter as well as the sequential split-range setter as discussed in 1×2 PID controller case can be readily applied to the 1×M PID controller case. To simplify, they are not presented here.

Since PID is a general-purpose controller, the 1×2 and 1×M PID controllers presented in this patent apply to all alternative forms of PID algorithms. They may be P only, PI, PD, or PID controllers, in analog or digital formulas, with various definitions of variables, parameters and units, etc.

This 1×M PID controller with its M sets of tuning parameters will be more powerful than a single-input-single-output PID controller with one set of tuning parameters when controlling an M×1 system. However, since it is not an adaptive controller, it may not be able to handle the large dynamic changes within the sub-systems even though the dynamic changes between the sub-systems may be handled by using different sets of PID tuning parameters. The 1×M Model-Free Adaptive (MFA) controller presented in this patent is a more preferred solution for controlling an M×1 system.

F. Single-Input-Multi-Output Controller

Figure 17:
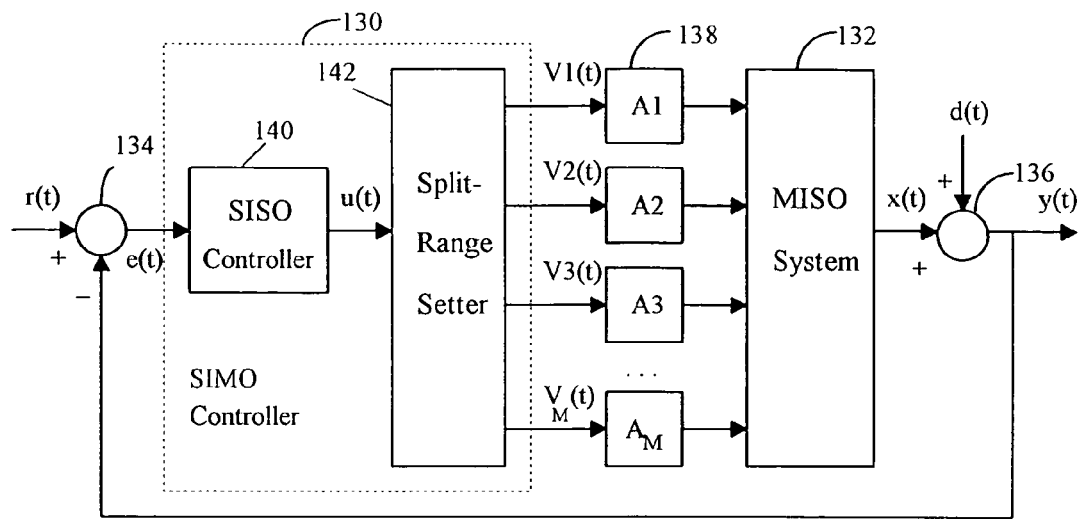
FIG. 17 is a block diagram illustrating a single-input-multi-output (SIMO) controller that controls a multi-input-single-output (MISO) system.

FIG. 17 illustrates a single-input-multi-output (SIMO) controller that controls a multi-input-single-output (MISO) system. The control system consists of a single-input-multi-output (SIMO) controller 130, a multi-input-single-output (MISO) system 132, actuators $A_1$ through $A_M$ 138, and signal adders, 134, 136. The signals shown in FIG. 17 are as follows:

r(t)—Setpoint.

y(t)—Measured Variable or the Process Variable, y(t)=x(t)+d(t).

x(t)—System Output.

$V_1(t)$—Controller Output 1 to manipulate Actuator $A_1$.

$V_2(t)$—Controller Output 2 to manipulate Actuator $A_2$.

$V_3(t)$—Controller Output 3 to manipulate Actuator $A_3$.

$V_M(t)$—Controller Output M to manipulate Actuator $A_M$.

d(t)—Disturbance, the disturbance caused by noise or load changes.

e(t)—Error between the Setpoint and Measured Variable, e(t)=r(t)−y(t).

The control objective is for the controller to produce outputs $V_1(t)$, $V_2(t)$, $V_3(t)$ . . . , $V_M(t)$ to manipulate actuators $A_1, A_2, A_3, \ldots, A_M$ so that the measured variable y(t) tracks the given trajectory of its setpoint r(t).

The SIMO controller consists of a single-input-single-output (SISO) controller 140 and a split-range setter mechanism 142. Without losing generality, we assume the control output of the SISO controller is calculated in the following general form $$u(t) = f(e(t), t, P_1, P_2, \ldots, P_1), \quad (63)$$

where e(t) is the difference between controller setpoint r(t) and controlled process variable y(t), t is time, and $P_1$, $P_2$, . . . , $P_1$ are the controller tuning parameters. Error e(t) is calculated based on the acting type of the process as follows:

$$e(t) = r(t) - y(t), \text{ if direct acting} \quad (64a)$$

$$e(t) = -[r(t) - y(t)], \text{ if reverse acting} \quad (64b)$$

Using the similar technique, we can design reverse split-range setters and sequential split-range setters as described in this patent for this SISO controller so that it can be converted to a 1×2, 1×3, . . . , or 1×M controller to control a 2×1, 3×1, . . . , or M×1 system, respectively.

We first present the results for the reverse split-range setter case when multiple control actions cancel each other. Assuming parameter $P_1$ is the controller gain, to compensate for the static gain changes caused by the split-range setting of $R_1, R_2, R_3 \ldots, R_{2M-2}$, we can re-scale the controller gains based on the following formulas:

$$P_{11} = K_1 \frac{R_1}{100}, \tag{65}$$

$$P_{12} = K_2 \frac{R_3 - R_2}{100}, \tag{66}$$

$$P_{13} = K_3 \frac{R_5 - R_4}{100}, \tag{67}$$

...

$$P_{1M} = K_M \frac{100 - R_{2M-2}}{100}, \tag{68}$$

where M=4, 5, 6, . . . ; $R_2 < R_3$, $R_4 < R_5$, $R_{2M-2} < R_{2M-1}$, and $K_1$, $K_2, K_3, \ldots, K_M$ are entered controller gains of this controller for calculating the corresponding signals $V_1(t)$, $V_2(t)$, $V_3(t)$, . . . , $V_M(t)$, respectively.

Figure 18:
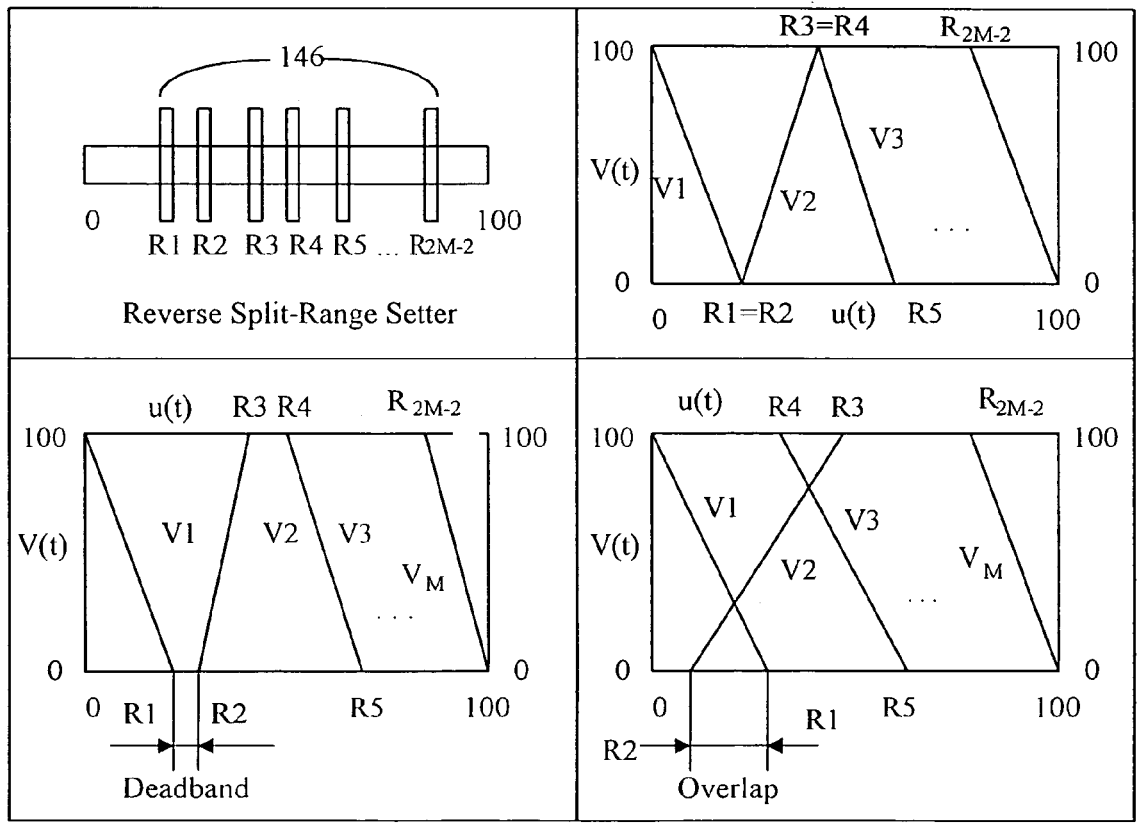
FIG. 18 is a drawing illustrating a mechanism of a reverse split-range setter that can easily split a single controller output into M or more ranges to manipulate M different actuators individually, simultaneously, or not at all.

FIG. 18 illustrates a reverse split-range setter that splits the controller signal u(t) into M or more ranges to manipulate M different actuators individually, simultaneously, or not at all by moving and setting the knobs $R_1$, $R_2$, $R_3$, . . . $R_{2M-2}$ 146, respectively. The controller outputs $V_1(t)$, $V_2(t)$ and $V_3(t)$ are calculated based on the following formulas as implemented in the split-range setter mechanism 142:

$$u(t) = f(e(t), t, P_{11}, P_{21}, \ldots, P_{l1}), \text{ for all } u(t) \in [0, R_1] \tag{69a}$$

$$V_1(t) = -100 \frac{u(t)}{R_1} + 100, \quad \text{for all } u(t) \in [0, R_1] \tag{69b}$$

$$V_1(t) = 0, \quad \text{for all } u(t) \in (R_1, 100] \tag{69c}$$

where $0 < R_1 \leq 100$, which defines the split range of u(t) for controller output $V_1(t)$;

$$u(t) = f(e(t), t, P_{12}, P_{22}, \ldots, P_{l2}), \text{ for all } u(t) \in [R_2, R_3] \tag{70a}$$

$$V_2(t) = -100 \frac{u(t) - R_3}{R_2 - R_3} + 100, \quad \text{for all } u(t) \in [R_2, R_3] \tag{70b}$$

$$V_2(t) = 0, \quad \text{for all } u(t) \in [0, R_2) \tag{70c}$$

$$V_2(t) = 100, \quad \text{for all } u(t) \in (R_3, 100] \tag{61d}$$

where $0 \leq R_2 < 100$, $0 < R_3 \leq 100$, and $R_2 < R_3$ which define the split range of u(t) for controller output $V_2(t)$;

$$u(t) = f(e(t), t, P_{13}, P_{23}, \ldots, P_{l3}), \text{ for all } u(t) \in [R_4, R_5] \tag{71a}$$

$$V_3(t) = -100 \frac{u(t) - R_4}{R_5 - R_4} + 100, \quad \text{for all } u(t) \in [R_4, R_5] \tag{71b}$$

$$V_3(t) = 100, \quad \text{for all } u(t) \in [0, R_4) \tag{71c}$$

$$V_3(t) = 0, \quad \text{for all } u(t) \in (R_5, 100] \tag{71d}$$

where $0 \leq R_4 < 100$, $0 < R_5 \leq 100$, and $R_4 < R_5$ which define the split range of u(t) for controller output $V_3(t)$; . . . ;

Without losing generality, the last control signal $V_M(t)$ can be calculated based on the following formulas:

$$u(t) = f(e(t), t, P_{1M}, P_{2M}, \ldots, P_{lM}), \text{ for all } u(t) \in [R_{2M-2}, 100] \tag{72a}$$

where M = 4, 5, 6, 7, . . . ;

$$V_M(t) = -100 \frac{u(t) - R_{2M-2}}{100 - R_{2M-2}} + 100, \quad \text{for all } u(t) \in [R_{2M-2}, 100] \tag{72b}$$

$$V_M(t) = 100, \quad \text{for all } u(t) \in [0, R_{2M-2}) \tag{72c}$$

where M = 5, 7, 9, . . . ; and $0 \leq R_{2M-2} < 100$;

$$V_M(t) = -100 \frac{u(t) - 100}{R_{2M-2} - 100} + 100, \quad \text{for all } u(t) \in [R_{2M-2}, 100] \tag{72d}$$

$$V_M(t) = 0, \quad \text{for all } u(t) \in [0, R_{2M-2}) \tag{72e}$$

where M=4, 6, 8, . . . ; and $0 \leq R_{2M-2} < 100$ which defines the split range of u(t) for controller output $V_M(t)$.

The signals u(t), $V_1(t)$, $V_2(t)$, $V_2(t)$, . . . , $V_M(t)$ all have a working range of 0% to 100%. Controller parameters $P_{11}$, $P_{12}, \ldots, P_{1M}, P_{21}, P_{22}, \ldots, P_{2M}, \ldots, P_{31}, P_{32}, \ldots, P_{3M}, \ldots, P_{11}, P_{12}, \ldots, P_{1M}$, are entered by the user during controller configuration. These are the controller tuning parameters suitable for the dynamics of the sub-systems between the manipulated variables $V_1(t)$, $V_2(t)$, $V_3(t)$, . . . , $V_M(t)$ to the controlled process variable y(t), respectively.

For the two special cases, when $R_{2i-2} > R_{2i-3}$ and u(t) is inside the signal overlap area; and when $R_{2i-2} < R_{2i-3}$ and u(t) is inside the deadband, we can simply let $$P_{1i} = \frac{P_{1,2i-2} + P_{1,2i-3}}{2}, \text{ for } u(t) \text{ inside deadband or overlap area} \tag{73a}$$

$$P_{2i} = \frac{P_{2,2i-2} + P_{2,2i-3}}{2}, \text{ for } u(t) \text{ inside deadband or overlap area} \tag{73b}$$

...

$$P_{l,i} = \frac{P_{l,2i-2} + P_{l,2i-3}}{2}, \text{ for } u(t) \text{ inside deadband or overlap area} \tag{73c}$$

where i=2, 3, 4, . . . , M. Then, the controller signal u(t) can be calculated based on these averaged controller tuning parameters accordingly based on whether or not u(t) is inside the deadband or overlap area. Equations (65) to (72) are still valid in these cases.

In the sequential split-range setter case when multiple control actions compliment each other, we can apply the similar technique to calculate the controller parameters. Assuming parameter $P_1$ is the controller gain, to compensate for the static gain changes caused by the sequential split-range setting of $S_1$, $S_2$, $S_3$ . . . , $S_{2M-2}$, we can re-scale the controller gains based on the following formulas:

$$P_{11} = K_1 \frac{S_1}{100}, \tag{74}$$

$$P_{12} = K_2 \frac{S_3 - S_2}{100}, \tag{75}$$

$$P_{13} = K_3 \frac{S_5 - S_4}{100}, \tag{76}$$

...

-continued $$P_{1M} = K_M \frac{100 - S_{2M-2}}{100}, \quad (77)$$

where M=4, 5, 6 . . . ; $S_2 < S_3$, $S_4 < S_5$, $S_{2M-2} < S_{2M-1}$, and $K_1$, $K_2$, $K_3$, . . . , $K_M$ are entered controller gains of this controller for $V_1(t)$, $V_2(t)$, $V_3(t)$, . . . , $V_M(t)$, respectively.

Figure 19:
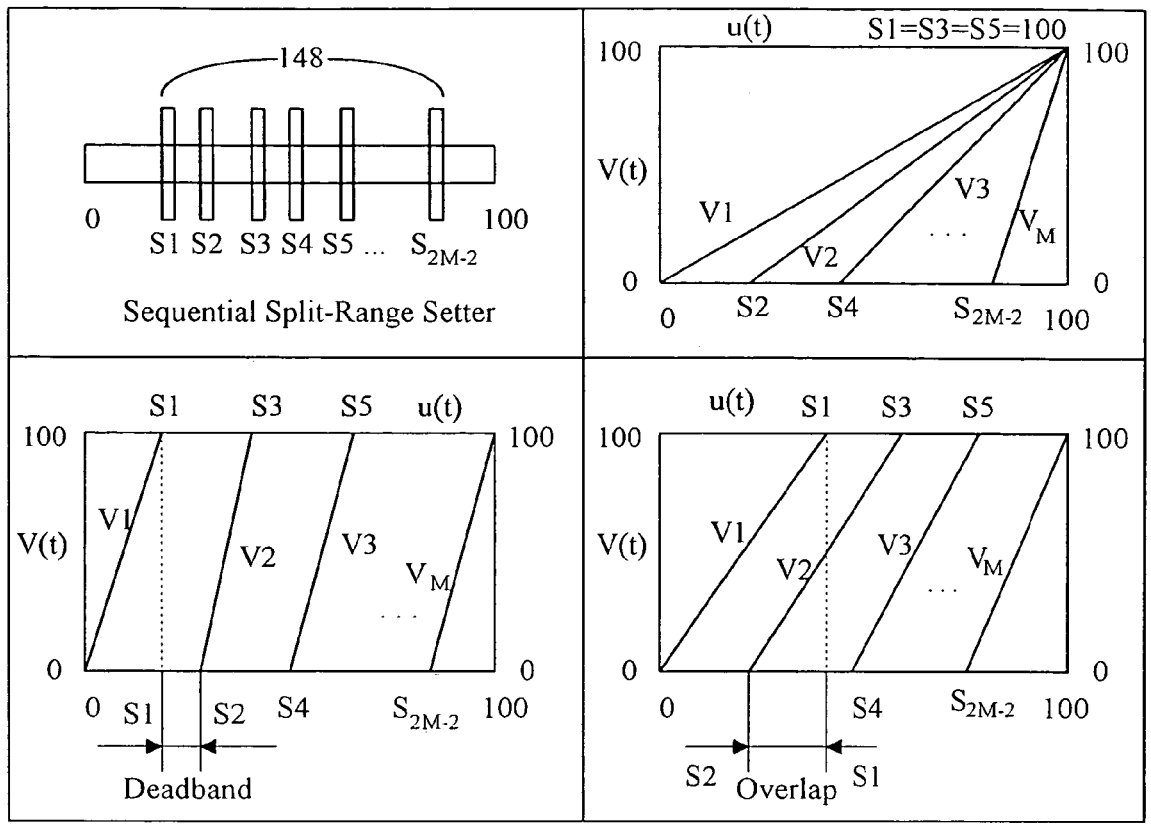
FIG. 19 is a drawing illustrating a mechanism of a sequential split-range setter that can convert a single controller output into M or more ranges to manipulate M different actuators individually, simultaneously, or not at all.

FIG. 19 illustrates a sequential split-range setter that converts the controller signal u(t) into M or more ranges to manipulate M different actuators individually, simultaneously, or not at all by moving and setting the knobs $S_1$, $S_2$, $S_3$, . . . , $S_{2M-2}$ 148, respectively. The controller outputs $V_1(t)$, $V_2(t)$, and $V_3(t)$ are calculated based on the following formulas as implemented in the split-range setter mechanism 142:

$$u(t) = f(e(t), t, P_{11}, P_{21}, \ldots, P_{l1}), \text{ for all } u(t) \in [0, S_1] \quad (78a)$$

$$V_1(t) = 100 \frac{u(t) - S_1}{S_1} + 100, \quad \text{for all } u(t) \in [0, S_1] \quad (78b)$$

$$V_1(t) = 100, \quad \text{for all } u(t) \in (S_1, 100] \quad (78c)$$

where $0 < S_1 \leq 100$, which defines the split range of u(t) for controller output $V_1(t)$;

$$u(t) = f(e(t), t, P_{12}, P_{22}, \ldots, P_{l2}), \text{ for all } u(t) \in [S_2, S_3] \quad (79a)$$

$$V_2(t) = -100 \frac{u(t) - S_3}{S_2 - S_3} + 100, \quad \text{for all } u(t) \in [S_2, S_3] \quad (79b)$$

$$V_2(t) = 0, \quad \text{for all } u(t) \in [0, S_2) \quad (79c)$$

$$V_2(t) = 100, \quad \text{for all } u(t) \in (S_3, 100] \quad (79d)$$

where $0 \leq S_2 < 100$, $0 < S_3 \leq 100$, and $S_2 < S_3$, which define the split range of u(t) for controller output $V_2(t)$; and $$u(t) = f(e(t), t, P_{13}, P_{23}, \ldots, P_{l3}), \text{ for all } u(t) \in [S_4, S_5] \quad (80a)$$

$$V_3(t) = -100 \frac{u(t) - S_5}{S_4 - S_5} + 100, \quad \text{for all } u(t) \in [S_4, S_5] \quad (80b)$$

$$V_3(t) = 0, \quad \text{for all } u(t) \in [0, S_4) \quad (80c)$$

$$V_3(t) = 100, \quad \text{for all } u(t) \in (S_5, 100] \quad (80d)$$

where $0 \leq S_4 < 100$, $0 < S_5 \leq 100$, and $S_4 < S_5$, which define the split range of u(t) for controller output $V_3(t)$; . . . ;

Without losing generality, the last control signal $V_M(t)$ of this 1×M controller can be calculated based on the following formulas:

$$u(t) = f(e(t), t, P_{1M}, P_{2M}, \ldots, P_{lM}), \text{ for all } u(t) \in [S_{2M-2}, 100] \quad (81a)$$

$$V_M(t) = -100 \frac{u(t) - 100}{S_{2M-2} - 100} + 100, \quad \text{for all } u(t) \in [S_{2M-2}, 100] \quad (81b)$$

$$V_M(t) = 0, \quad \text{for all } u(t) \in [0, S_{2M-2}] \quad (81c)$$

where M=4, 5, 6, 7, . . . ; and $0 \leq S_{2M-2} < 100$ which defines the split range of u(t) for controller output $V_M(t)$.

The signals u(t), $V_1(t)$, $V_2(t)$, $V_3(t)$, . . . , $V_M(t)$ all have a working range of 0% to 100%. Controller parameters $P_{11}$, $P_{12}$, . . . , $P_{1M}$, $P_{21}$, $P_{22}$, . . . , $P_{2M}$, . . . , $P_{31}$, $P_{32}$, . . . , $P_{3M}$, . . . , $P_{l1}$, $P_{l2}$, . . . , $P_{lM}$ are entered by the user during controller configuration. These are the controller tuning parameters suitable for the dynamics of the sub-systems between the manipulated variables $V_1(t)$, $V_2(t)$, $V_3(t)$, . . . , $V_M(t)$ to the controlled process variable y(t), respectively.

The alternative design of the reverse split-range setter and the sequential split-range setter as discussed in 1×3 MFA controller case of this patent can be readily applied to this 1×M controller case. To simplify, they are not presented here.

G. SIMO Controller with Combined Split-Range Setter

Figure 20:
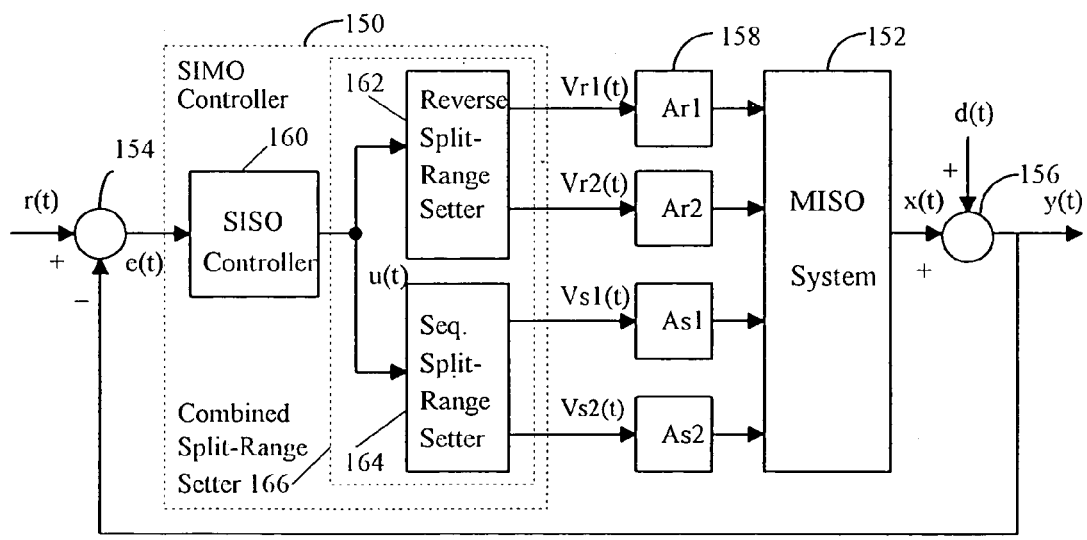
FIG. 20 is a block diagram illustrating a single-input-multi-output (SIMO) controller that controls a multi-input-single-output (MISO) system, where a combined split-range setter is used.

FIG. 20 illustrates a single-input-multi-output (SIMO) controller that controls a multi-input-single-output (MISO) system, where a combined split-range setter is used. The control system consists of a single-input-multi-output (SIMO) controller 150, a multi-input-single-output (MISO) system 152, actuators $A_{r1}$ $A_{r2}$ $A_{s1}$ and $A_{s2}$ 158, and signal adders, 154, 156. The signals shown in FIG. 20 are as follows:

r(t)—Setpoint.

y(t)—Measured Variable or the Process Variable, y(t)=x(t)+d(t).

x(t)—System Output.

$V_{r1}(t)$—Controller Output to manipulate Actuator $A_{r1}$.

$V_{r2}(t)$—Controller Output to manipulate Actuator $A_{r2}$.

$V_{s1}(t)$—Controller Output to manipulate Actuator $A_{s1}$.

$V_{s2}(t)$—Controller Output to manipulate Actuator $A_{s2}$.

d(t)—Disturbance, the disturbance caused by noise or load changes.

e(t)—Error between the Setpoint and Measured Variable, e(t)=r(t)−y(t).

The control objective is for the controller to produce outputs $V_{r1}(t)$, $V_{r2}(t)$, $V_{s1}(t)$, and $V_{s2}(t)$ to manipulate actuators $A_{r1}$, $A_{r2}$, $A_{s1}$, and $A_{s2}$ so that the measured variable y(t) tracks the given trajectory of its setpoint r(t).

The SIMO controller 150 consists of a single-input-single-output (SISO) controller 160 and a combined split-range setter 166. The combined split-range setter combines the control actions that cancel each other and the control actions that compliment each other. For instance, a pH control system may use a coarse acid valve, a fine acid valve, a coarse caustic valve, and a fine caustic valve to provide sufficient working range for dosing the acid and caustic reagent simultaneously, individually, or not at all.

The combined split-range setter 166 in FIG. 20 consists of a reverse split-range setter mechanism 162, and a sequential split-range setter mechanism 164. This is an example of how a combined split-range setter mechanism can be constructed to convert the controller signal u(t) of a SISO controller to control outputs $V_{r1}(t)$, $V_{r2}(t)$, $V_{s1}(t)$ and $V_{s2}(t)$ to manipulate actuators $A_{r1}$, $A_{r2}$, $A_{s1}$, and $A_{s2}$, which include control actions that cancel each other and control actions that compliment each other.

We assume the control output of the SISO controller is calculated in the following general form $$u(t) = f(e(t), t, P_1, P_2, \ldots, P_l), \quad (82)$$

where e(t) is the difference between controller setpoint r(t) and controlled process variable y(t), t is time, and $P_1$, $P_2, \ldots, P_1$ are the controller tuning parameters. Error $e(t)$ is calculated based on the acting type of the process as follows:

$$e(t) = r(t) - y(t), \text{ if direct acting} \qquad (83a)$$

$$e(t) = -[r(t) - y(t)], \text{ if reverse acting} \qquad (83b)$$

Without losing generality, we will use the 1×2 reverse split-range setter as illustrated in FIG. 3 and the 1×2 sequential split-range setter as illustrated in FIG. 5 to demonstrate the idea of constructing a combined split-range setter. Since we have shown the detailed design of the 1×3 and 1×M reverse split-range setters as well as the 1×3 and 1×M sequential split-range setters, the 1×3 and 1×M combined split-range setters can be constructed in a similar way. To simplify, they are not presented here.

The reverse split-range setter shown in FIG. 3 splits the controller signal $u(t)$ into 2 or more ranges to manipulate 2 different actuators individually, simultaneously, or neither by moving and setting the knobs $R_1$ and $R_2$ 50, respectively. The corresponding controller outputs $V_{r1}(t)$ and $V_{r2}(t)$ in FIG. 20 are calculated based on the following formulas:

$$V_{r1}(t) = -100 \frac{u(t)}{R_1} + 100, \text{ for all } u(t) \in [0, R_1] \qquad (84a)$$

$$V_{r1}(t) = 0, \text{ for all } u(t) \in (R_1, 100] \qquad (84b)$$

where $0 < R_1 \leq 100$, which defines the split range of $u(t)$ for controller output $V_{r1}(t)$; and $$V_{r2}(t) = -100 \frac{u(t) - 100}{R_2 - 100} + 100, \text{ for all } u(t) \in [R_2, 100] \qquad (85a)$$

$$V_{r2}(t) = 0, \text{ for all } u(t) \in [0, R_2) \qquad (85b)$$

where $0 \leq R_2 < 100$, which defines the split range of $u(t)$ for controller output $V_{r2}(t)$.

The sequential split-range setter as illustrated in FIG. 5 converts the controller signal $u(t)$ into 2 or more ranges to manipulate 2 different actuators individually, simultaneously, or neither by moving and setting the knobs $S_1$ and $S_2$ 54, respectively. The corresponding controller outputs $V_{s1}(t)$ and $V_{s2}(t)$ in FIG. 20 are calculated based on the following formulas:

$$V_{s1}(t) = 100 \frac{u(t) - S_1}{S_1} + 100, \text{ for all } u(t) \in [0, S_1] \qquad (86a)$$

$$V_{s1}(t) = 100, \text{ for all } u(t) \in (S_1, 100] \qquad (86b)$$

where $0 < S_1 \leq 100$, which defines the split range of $u(t)$ for controller output $V_{s1}(t)$; and $$V_{s2}(t) = -100 \frac{u(t) - 100}{S_2 - 100} + 100, \text{ for all } u(t) \in [S_2, 100] \qquad (87a)$$

$$V_{s2}(t) = 0, \text{ for all } u(t) \in [0, S_2) \qquad (87b)$$

where $0 \leq S_2 < 100$, which defines the split range of $u(t)$ for controller output $V_{s2}(t)$.

The signals $u(t)$, $V_{r1}(t)$, $V_{r2}(t)$, $V_{s1}(t)$ and $V_{s2}(t)$ all have a working range of 0% to 100%. We can easily rescale each of the output signals $V_{r1}(t)$, $V_{r2}(t)$, $V_{s1}(t)$ and $V_{s2}(t)$ from its 0% to 100% range to an engineering value range by using a linear function. In addition, control limits and constraints can be applied to these signals for safety or other reasons to limit the control actions.

This is the general case example of converting a single-input-single-output (SISO) controller including but not limited to a model-free adaptive (MFA) controller, or a proportional-integral-derivative (PID) controller, or any other form of SISO controller to a single-input-multi-output (SIMO) controller to manipulate M actuators individually, simultaneously, or not at all to control a multi-input-single-output (MISO) system or process. In these cases, control actions may cancel each other or compliment each other. The reverse split-range setters and sequential split-range setters presented in this patent can be combined in one combined split-range setter mechanism to perform respective control actions to achieve control objectives. While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A 1-input-2-output controller for a process having a process output which is controlled by two controller outputs $V_1(t)$ and $V_2(t)$ applied to two actuators whose outputs are the inputs of said process, said controller including a neural network comprising:
   a) an error input representative of the difference between a predetermined setpoint and said process output;
   b) a normalization unit for normalizing said error input to a predetermined range of values;
   c) a scaling function for scaling said normalized error input to produce a value $E_1$ of the form $$E_1 = \frac{K_{cx}}{T_{cx}} N(e(t)),$$

or an equivalent thereof, in which $K_{cx}$ is the controller gain; $T_{cx}$ is the user-selected time constant of said process; $N(\cdot)$ is the normalization function of said normalization unit; and $e(t)$ is the value of said error input at any given time;
   d) a layer of input neurons having as their inputs successively time-delayed values of $E_1$;
   e) a layer of hidden neurons each having as its output the sum of individually weighted ones of said successively time-delayed values of $E_1$;
   f) an output neuron having as its output the sum of a first function of the individually weighted outputs of said hidden neurons;
   g) a control signal $u(t)$ which is at least in part the denormalized value of a second function of the output of said output neuron; and
   h) a split-range setter arranged to produce from the said control signal the said controller outputs $V_1(t)$ and $V_2(t)$.

2. The controller of claim 1, in which said control signal $u(t)$ is the sum of said denormalized value and the value $K_{cx}e(t)$, or an equivalent thereof.

3. The controller of claim 1, in which said first and second functions are both of the form $$f(x) = 0, \quad \text{if } x < -\frac{b}{a}$$

$$f(x) = ax + b, \quad \text{if } -\frac{b}{a} \leq x \leq \frac{b}{a}$$

$$f(x) = 1, \quad \text{if } x > \frac{b}{a}$$

or an equivalent thereof, wherein a is an arbitrary constant and b=½.

4. The controller of claim 1, in which the said scaling function for scaling said normalized error input to produce a value $E_1$ of the form $$E_1 = \frac{K_{c1}}{T_{c1}} N(e(t)), \quad \text{for all } u(t) \in [0, R_1]$$

$$E_1 = \frac{K_{c2}}{T_{c2}} N(e(t)), \quad \text{for all } u(t) \in [R_2, 100]$$

or an equivalent thereof, in which $K_{c1}$ and $K_{c2}$ are controller gains; $T_{c1}$ and $T_{c2}$ are the user-selected time constants of said process; $N(\cdot)$ is the normalization function of said normalization unit; e(t) is the value of said error input at any given time; and $R_1$ and $R_2$ are two values within 0 to 100.

5. The controller of claim 1, in which said control signal is of the form:

$$u(t) = K_{c1} e(t) + 100 \left[ a \sum_{j=1}^{N} h_j(n) q_j(n) + b \right], \quad \text{for all } u(t) \in [0, R_1]$$

$$u(t) = K_{c2} e(t) + 100 \left[ a \sum_{j=1}^{N} h_j(n) q_j(n) + b \right], \quad \text{for all } u(t) \in [R_2, 100]$$

or an equivalent thereof, in which $K_{c1}$ and $K_{c2}$ are controller gains; e(t) is said error signal; $h_j(n)$ is the weighting factor for the jth hidden neuron output; $q_j(n)$ is the jth hidden neuron output; and $R_1$ and $R_2$ are two values within 0 to 100.

6. The controller of claim 5, in which said controller gains $K_{c1}$ and $K_{c2}$ are of the form:

$$K_{c1} = K_1 \frac{R_1}{100},$$

$$K_{c2} = K_2 \frac{100 - R_2}{100},$$

or an equivalent thereof, in which $K_1$ and $K_2$ are user-selected controller gains for controller outputs $V_1(t)$ and $V_2(t)$; and $R_1$ and $R_2$ are two values within 0 to 100.

7. The controller of claim 1, in which the said scaling function for scaling said normalized error input to produce the value $E_1$ is of the form $$E_1 = \frac{K_c}{T_c} N(e(t)),$$

or an equivalent thereof, where the controller gain $K_c$ and time constant $T_c$ are of the form:

$$K_c = \frac{K_{c1} + K_{c2}}{2},$$

$$T_c = \frac{T_{c1} + T_{c2}}{2},$$

or an equivalent thereof, in which $K_1$ and $K_2$ are user-selected controller gains for controller outputs $V_1(t)$ and $V_2(t)$; u(t) is inside the signal overlap area if the signals $V_1(t)$ and $V_2(t)$ overlap; or u(t) is inside the deadband if a deadband between the signals $V_1(t)$ and $V_2(t)$ exist.

8. A 1-input-2-output Proportional-Integral-Derivative (PID) controller for a process having a process output which is controlled by two controller outputs $V_1(t)$ and $V_2(t)$ applied to two actuators whose outputs are the inputs of said process, said controller comprising:

a) an error input representative of the difference between a predetermined setpoint and said process output;

b) a control signal u(t) is of the form:

$$u(t) = K_p \left\{ e(t) + \frac{1}{T_i} \int e(t) dt + T_d \frac{de(t)}{dt} \right\},$$

or equivalent thereof, in which $K_p$ is the proportional gain, $T_i$ is the integral time, and $T_d$ is the derivative time; e(t) is the value of said error input at any given time; and c) a split-range setter arranged to produce from the said control signal the said controller outputs $V_1(t)$ and $V_2(t)$.

9. The controller of claim 8, in which said control signal is of the form:

$$u(t) = K_{p1} \left\{ e(t) + \frac{1}{T_{i1}} \int e(t) dt + T_{d1} \frac{de(t)}{dt} \right\}, \quad \text{for all } u(t) \in [0, R_1]$$

$$u(t) = K_{p2} \left\{ e(t) + \frac{1}{T_{i2}} \int e(t) dt + T_{d2} \frac{de(t)}{dt} \right\}, \quad \text{for all } u(t) \in [R_2, 100]$$

or an equivalent thereof, in which $K_{p1}$ and $K_{p2}$ are the proportional gains, $T_{i1}$ and $T_{i2}$ are the integral times, $T_{d1}$ and $T_{d2}$ are the derivative times; e(t) is said error signal; and $R_1$ and $R_2$ are two values within 0 to 100.

10. The controller of claim 9, in which said proportional gain, integral time, and derivative time are of the form:

$$K_P = \frac{K_{P1} + K_{p2}}{2},$$

$$T_i = \frac{T_{i1} + T_{i2}}{2},$$

$$T_d = \frac{T_{d1} + T_{d2}}{2},$$

or an equivalent thereof, in which u(t) is inside the signal overlap area if the signals $V_1(t)$ and $V_2(t)$ overlap; or u(t) is inside the deadband if a deadband between the signals $V_1(t)$ and $V_2(t)$ exist.

11. The controller of claim 9, in which said proportional gains are of the form:

$$K_{p1} = K_1 \frac{R_1}{100},$$

$$K_{p2} = K_2 \frac{100 - R_2}{100},$$

or an equivalent thereof, in which $K_1$ and $K_2$ are user-selected proportional gains of PID for said controller outputs $V_1(t)$ and $V_2(t)$; and $R_1$ and $R_2$ are two values within 0 to 100.

12. The controller of claim 1 or 8, in which said split-range setter produces the said controller outputs of the form:

$$V_1(t) = -100 \frac{u(t)}{R_1} + 100, \quad \text{for all } u(t) \in [0, R_1]$$

$$V_1(t) = 0, \quad \text{for all } u(t) \in [R_1, 100]$$

$$V_2(t) = -100 \frac{u(t) - 100}{R_2 - 100} + 100, \quad \text{for all } u(t) \in [R_2, 100]$$

$$V_2(t) = 0, \quad \text{for all } u(t) \in [0, R_2]$$

or an equivalent thereof, in which $0 < R_1 \leq 100$, $0 \leq R_2 < 100$, the signals $u(t)$, $V_1(t)$, and $V_2(t)$ all having a working range of 0 to 100.

13. The controller of claim 1 or 8, in which said split-range setter produces the said controller outputs of the form:

$$V_1(t) = 100 \frac{u(t) - R_1}{R_1} + 100, \quad \text{for all } u(t) \in [0, R_1]$$

$$V_1(t) = 100, \quad \text{for all } u(t) \in [R_1, 100]$$

$$V_2(t) = -100 \frac{u(t) - R_2}{100 - R_2} + 100, \quad \text{for all } u(t) \in [R_2, 100]$$

$$V_2(t) = 100, \quad \text{for all } u(t) \in [0, R_2]$$

or an equivalent thereof, in which $0 < R_1 \leq 100$, $0 \leq R_2 < 100$, the signals $u(t)$, $V_1(t)$, and $V_2(t)$ all having a working range of 0 to 100.

14. The controller of claim 1 or 8, in which said split-range setter produces the said controller outputs of the form:

$$V_1(t) = 100 \frac{u(t) - S_1}{S_1} + 100, \quad \text{for all } u(t) \in [0, S_1]$$

$$V_1(t) = 100, \quad \text{for all } u(t) \in [S_1, 100]$$

$$V_2(t) = -100 \frac{u(t) - 100}{S_2 - 100} + 100, \quad \text{for all } u(t) \in [S_2, 100]$$

$$V_2(t) = 0, \quad \text{for all } u(t) \in [0, S_2]$$

or an equivalent thereof, in which $0 < S_1 \leq 100$, $0 \leq S_2 < 100$, the signals $u(t)$, $V_1(t)$, and $V_2(t)$ all having a working range of 0 to 100.

15. The controller of claim 1 or 8, in which said split-range setter produces the said controller outputs of the form:

$$V_1(t) = -100 \frac{u(t)}{S_1} + 100, \quad \text{for all } u(t) \in [0, S_1]$$

$$V_1(t) = 0, \quad \text{for all } u(t) \in [S_1, 100]$$

$$V_2(t) = -100 \frac{u(t) - S_2}{100 - S_2} + 100, \quad \text{for all } u(t) \in [S_2, 100]$$

$$V_2(t) = 100, \quad \text{for all } u(t) \in [0, S_2)$$

or an equivalent thereof, in which $0 < S_1 \leq 100$, $0 \leq S_2 < 100$, the signals $u(t)$, $V_1(t)$, and $V_2(t)$ all having a working range of 0 to 100.

16. The controller of claim 12, 13, 14, or 15, in which said split-range setter includes individual controls that can be set freely within said split range to produce controller outputs $V_1(t)$, and $V_2(t)$ that provide a deadband between said controller outputs, an overlap thereof, or a continuum from one to the other.

17. The controller of claim 1 or 8, in which the controller outputs $V_1(t)$ and $V_2(t)$ are re-scalable from the 0 to 100 range to an engineering value range by using a linear function.

18. The controller of claim 1 or 8, in which the controller outputs $V_1(t)$ and $V_2(t)$ are arranged to include selectable control limits or control constraints.

19. A 1-input-3-output controller for a process having a process output which is controlled by three controller outputs $V_1(t)$, $V_2(t)$, and $V_3(t)$ applied to three actuators whose outputs are the inputs of said process, said controller including a neural network comprising:
   a) an error input representative of the difference between a predetermined setpoint and said process output;
   b) a normalization unit for normalizing said error input to a predetermined range of values;
   c) a scaling function for scaling said normalized error input to produce a value $E_1$ of the form $$E_1 = \frac{K_{c1}}{T_{c1}} N(e(t)), \quad \text{for all } u(t) \in [0, R_1]$$

$$E_1 = \frac{K_{c2}}{T_{c2}} N(e(t)), \quad \text{for all } u(t) \in [R_2, R_3]$$

$$E_1 = \frac{K_{c3}}{T_{c3}} N(e(t)), \quad \text{for all } u(t) \in [R_4, 100]$$

or equivalent thereof, in which $0 < R_1 \leq 100$, $0 \leq R_2 < 100$, $0 < R_3 \leq 100$, $R_2 < R_3$, $0 \leq R_4 < 100$, $K_{c1}$, $K_{c2}$, and $K_{c3}$ are the controller gains; $T_{c1}$, $T_{c2}$, and $T_{c3}$ are the user-selected time constants of said process; $N(\cdot)$ is the normalization function of said normalization unit; and $e(t)$ is the value of said error input at any given time;
   d) a layer of input neurons having as their inputs successively time-delayed values of $E_1$;
   e) a layer of hidden neurons each having as its output the sum of individually weighted ones of said successively time-delayed values of $E_1$;
   f) an output neuron having as its output the sum of a first function of the individually weighted outputs of said hidden neurons;
   g) a control signal $u(t)$ which is at least in part the denormalized value of a second function of the output of said output neuron; and
   h) a split-range setter arranged to produce from the said control signal the said controller outputs $V_1(t)$, $V_2(t)$, and $V_3(t)$.

20. The controller of claim 19, in which said first and second functions are both of the form $$f(x) = 0, \quad \text{if } x < -\frac{b}{a}$$

$$f(x) = ax + b, \quad \text{if } -\frac{b}{a} \leq x \leq \frac{b}{a}$$

$$f(x) = 1, \quad \text{if } x > \frac{b}{a}$$

or an equivalent thereof, wherein a is an arbitrary constant and b=½.

21. The controller of claim 19, in which said control signal is of the form:

$$u(t) = K_{c1}e(t) + 100\left[a\sum_{j=1}^{N} h_j(n)q_j(n) + b\right], \quad \text{for all } u(t) \in [0, R_1]$$

$$u(t) = K_{c2}e(t) + 100\left[a\sum_{j=1}^{N} h_j(n)q_j(n) + b\right], \quad \text{for all } u(t) \in [R_2, R_3]$$

$$u(t) = K_{c3}e(t) + 100\left[a\sum_{j=1}^{N} h_j(n)q_j(n) + b\right], \quad \text{for all } u(t) \in [R_4, 100]$$

or equivalent thereof, in which $0 < R_1 \leq 100$, $0 \leq R_2 < 100$, $0 < R_3 \leq 100$, $R_2 < R_3$, $0 \leq R_4 < 100$, $K_{c1}$, $K_{c2}$, and $K_{c3}$ are the controller gains; e(t) is said error signal; $h_j(n)$ is the weighting factor for the jth hidden neuron output; and $q_j(n)$ is the jth hidden neuron output.

22. The controller of claim 19, in which said split-range setter produces the said controller outputs of the form:

$$V_1(t) = -100\frac{u(t)}{R_1} + 100, \quad \text{for all } u(t) \in [0, R_1]$$

$$V_1(t) = 0, \quad \text{for all } u(t) \in (R_1, 100]$$

$$V_2(t) = -100\frac{u(t) - R_3}{R_2 - R_3} + 100, \quad \text{for all } u(t) \in [R_2, R_3]$$

$$V_2(t) = 0, \quad \text{for all } u(t) \in [0, R_2)$$

$$V_2(t) = 100, \quad \text{for all } u(t) \in (R_3, 100]$$

$$V_3(t) = -100\frac{u(t) - R_4}{100 - R_4} + 100, \quad \text{for all } u(t) \in [R_4, 100]$$

$$V_3(t) = 100, \quad \text{for all } u(t) \in [0, R_4)$$

or equivalent thereof, in which $0 < R_1 \leq 100$, $0 \leq R_2 < 100$, $0 < R_3 \leq 100$, $R_2 < R_3$, $0 \leq R_4 < 100$, the signals u(t), $V_1(t)$, $V_2(t)$, and $V_3(t)$ all having a working range of 0 to 100.

23. The controller of claim 19, in which said split-range setter produces the said controller outputs of the form:

$$V_1(t) = 100\frac{u(t) - R_1}{R_1} + 100, \quad \text{for all } u(t) \in [0, R_1]$$

$$V_1(t) = 100, \quad \text{for all } u(t) \in (R_1, 100]$$

$$V_2(t) = -100\frac{u(t) - R_2}{R_3 - R_2} + 100, \quad \text{for all } u(t) \in [R_2, R_3]$$

$$V_2(t) = 100, \quad \text{for all } u(t) \in [0, R_2)$$

$$V_2(t) = 0, \quad \text{for all } u(t) \in (R_3, 100]$$

$$V_3(t) = -100\frac{u(t) - 100}{R_4 - 100} + 100, \quad \text{for all } u(t) \in [R_4, 100]$$

$$V_3(t) = 0, \quad \text{for all } u(t) \in [0, R_4)$$

or equivalent thereof, in which $0 < R_1 \leq 100$, $0 \leq R_2 < 100$, $0 < R_3 \leq 100$, $R_2 < R_3$, $0 \leq R_4 < 100$, the signals u(t), $V_1(t)$, $V_2(t)$, and $V_3(t)$ all having a working range of 0 to 100.

24. The controller of claim 19, in which said split-range setter produces the said controller outputs of the form:

$$V_1(t) = 100\frac{u(t) - S_1}{S_1} + 100, \quad \text{for all } u(t) \in [0, S_1]$$

$$V_1(t) = 100, \quad \text{for all } u(t) \in (S_1, 100]$$

$$V_2(t) = -100\frac{u(t) - S_3}{S_2 - S_3} + 100, \quad \text{for all } u(t) \in [S_2, S_3]$$

$$V_2(t) = 0, \quad \text{for all } u(t) \in [0, S_2)$$

$$V_2(t) = 100, \quad \text{for all } u(t) \in (S_3, 100]$$

$$V_3(t) = -100\frac{u(t) - 100}{S_4 - 100} + 100, \quad \text{for all } u(t) \in [S_4, 100]$$

$$V_3(t) = 0, \quad \text{for all } u(t) \in [0, S_4)$$

or equivalent thereof, in which $0 < S_1 \leq 100$, $0 \leq S_2 < 100$, $0 < S_3 \leq 100$, $S_2 < S_3$, and $0 \leq S_4 < 100$; $S_j$ being equivalent to $R_j$, j=1, 2, 3, 4; the signals u(t), $V_1(t)$, $V_2(t)$, and $V_3(t)$ all having a working range of 0 to 100.

25. The controller of claim 19, in which said split-range setter produces the said controller outputs of the form:

$$V_1(t) = -100\frac{u(t)}{S_1} + 100, \quad \text{for all } u(t) \in [0, S_1]$$

$$V_1(t) = 0, \quad \text{for all } u(t) \in (S_1, 100]$$

$$V_2(t) = -100\frac{u(t) - S_2}{S_3 - S_2} + 100, \quad \text{for all } u(t) \in [S_2, S_3]$$

$$V_2(t) = 100, \quad \text{for all } u(t) \in [0, S_2)$$

$$V_2(t) = 0, \quad \text{for all } u(t) \in (S_3, 100]$$

$$V_3(t) = -100\frac{u(t) - S_4}{100 - S_4} + 100, \quad \text{for all } u(t) \in [S_4, 100]$$

$$V_3(t) = 100, \quad \text{for all } u(t) \in [0, S_4)$$

or equivalent thereof, in which $0 < S_1 \leq 100$, $0 \leq S_2 < 100$, $0 < S_3 \leq 100$, $S_2 < S_3$, and $0 \leq S_4 100$; $S_j$ being equivalent to $R_j$, j=1, 2, 3, 4; the signals u(t), $V_1(t)$, $V_2(t)$, and $V_3(t)$ all having a working range of 0 to 100.

26. The controller of claim 22, 23, 24, or 25, in which said split-range setter includes individual controls that can be set freely within said split range to produce controller outputs $V_1(t)$, $V_2(t)$ and $V_3(t)$ that provide a deadband between said controller outputs, an overlap thereof, or a continuum from one to the other.

27. The controller of claim 19, in which the controller outputs $V_1(t)$, $V_2(t)$ and $V_3(t)$ are re-scalable from the 0 to 100 range to an engineering value range by using a linear function.

28. The controller of claim 19, in which the controller outputs $V_1(t)$, $V_2(t)$ and $V_3(t)$ are arranged to include selectable control limits or control constraints.

29. A 1-input-M-output controller for a process having a process output which is controlled by M controller outputs $V_1(t), V_2(t), \ldots, V_M(t)$ applied to M actuators whose outputs are the inputs of said process, said controller including a neural network comprising:
   a) an error input representative of the difference between a predetermined setpoint and said process output;
   b) a normalization unit for normalizing said error input to a predetermined range of values;
   c) a scaling function for scaling said normalized error input to produce a value $E_1$ of the form $$E_1 = \frac{K_{c1}}{T_{c1}} N(e(t)), \quad \text{for all } u(t) \in [0, R_1]$$

$$E_1 = \frac{K_{c2}}{T_{c2}} N(e(t)), \quad \text{for all } u(t) \in [R_2, R_3]$$

$$\ldots$$

$$E_1 = \frac{K_{cM}}{T_{cM}} N(e(t)), \quad \text{for all } u(t) \in [R_{2M-2}, 100]$$

or equivalent thereof, in which $0 < R_1 \leq 100$, $0 \leq R_2 < 100$, $0 < R_3 \leq 100$, $R_2 < R_3, \ldots, 0 \leq R_{2M-2} < 100$, $M=3, 4, 5, 6 \ldots$; $K_{c1}, K_{c2}, \ldots, K_{cM}$ are the controller gains; $T_{c1}, T_{c2}, \ldots, T_{cM}$ are the user-selected time constants of said process; $N(\cdot)$ is the normalization function of said normalization unit; and $e(t)$ is the value of said error input at any given time;
   d) a layer of input neurons having as their inputs successively time-delayed values of $E_1$;
   e) a layer of hidden neurons each having as its output the sum of individually weighted ones of said successively time-delayed values of $E_1$;
   f) an output neuron having as its output the sum of a first function of the individually weighted outputs of said hidden neurons;
   g) a control signal $u(t)$ which is at least in part the denormalized value of a second function of the output of said output neuron; and
   h) a split-range setter arranged to produce from the said control signal the said controller outputs $V_1(t), V_2(t), \ldots, V_M(t)$.

30. The controller of claim 29, in which said control signal $u(t)$ is the sum of said denormalized value and the value $K_{cx} e(t)$, or an equivalent thereof.

31. The controller of claim 29, in which said first and second functions are both of the form $$f(x) = 0, \quad \text{if } x < -\frac{b}{a}$$

$$f(x) = ax + b, \quad \text{if } -\frac{b}{a} \leq x \leq \frac{b}{a}$$

$$f(x) = 1, \quad \text{if } x > \frac{b}{a}$$

or an equivalent thereof, wherein $a$ is an arbitrary constant and $b = \frac{1}{2}$.

32. The controller of claim 29, in which said control signal is of the form:

$$u(t) = K_{c1} e(t) + 100[a \sum_{j=1}^{N} h_j(n) q_j(n) + b], \text{ for all } u(t) \in [0, R_1]$$

$$u(t) = K_{c2} e(t) + 100[a \sum_{j=1}^{N} h_j(n) q_j(n) + b], \text{ for all } u(t) \in [R_2, R_3]$$

$$\ldots$$

$$u(t) = K_{cM} e(t) + 100[a \sum_{j=1}^{N} h_j(n) q_j(n) + b], \text{ for all } u(t) \in [R_{2M-2}, 100]$$

or equivalent thereof, in which $0 < R_1 \leq 100$, $0 \leq R_2 < 100$, $0 < R_3 \leq 100$, $R_2 < R_3, \ldots, 0 \leq R_{2M-2} < 100$, $M=3, 4, 5, 6 \ldots$; $K_{c1}, K_{c2}, \ldots, K_{cM}$ are the controller gains; $e(t)$ is said error signal; $h_j(n)$ is the weighting factor for the jth hidden neuron output; and $q_j(n)$ is the jth hidden neuron output.

33. A 1-input-M-output Proportional-Integral-Derivative (PID) controller for a process having a process output which is controlled by M controller outputs $V_1(t), V_2(t), \ldots, V_M(t)$ applied to M actuators whose outputs are the inputs of said process, said controller comprising:
   a) an error input representative of the difference between a predetermined setpoint and said process output;
   b) a control signal $u(t)$ is, of the form:

$$u(t) = K_p \left\{ e(t) + \frac{1}{T_i} \int e(t) dt + T_d \frac{de(t)}{dt} \right\},$$

or equivalent thereof, in which $K_p$ is the proportional gain, $T_i$ is the integral time, and $T_d$ is the derivative time; $e(t)$ is the value of said error input at any given time; and
   c) a split-range setter arranged to produce from the said control signal the said controller outputs $V_1(t), V_2(t), \ldots, V_M(t)$.

34. The controller of claim 33, in which said control signal is of the form:

$$u(t) = K_{p1} \left\{ e(t) + \frac{1}{T_{i1}} \int e(t) dt + T_{d1} \frac{de(t)}{dt} \right\}, \text{ for all } u(t) \in [0, R_1]$$

$$u(t) = K_{p2} \left\{ e(t) + \frac{1}{T_{i2}} \int e(t) dt + T_{d2} \frac{de(t)}{dt} \right\}, \text{ for all } u(t) \in [R_2, R_3]$$

$$\ldots$$

$$u(t) = K_{pM} \left\{ e(t) + \frac{1}{T_{iM}} \int e(t) dt + T_{dM} \frac{de(t)}{dt} \right\}, \text{ for all } u(t) \in [R_{2M-2}, 100]$$

or an equivalent thereof, in which $K_{p1}, K_{p2}, \ldots, K_{pM}, T_{i1}, T_{i2}, \ldots, T_{iM}, T_{d1}, T_{d2}, \ldots, T_{dM}$ are user-selectable parameters, $0 < R_1 \leq 100$, $0 \leq R_2 < 100$, $0 < R_3 \leq 100$, $R_2 < R_3, \ldots, 0 \leq R_{2M-2} < 100$, $M=3, 4, 5, 6 \ldots$; and $e(t)$ is said error signal.

35. The controller of claim 29 or 33, in which said split-range setter produces the said controller outputs of the form:

$$V_1(t) = -100 \frac{u(t)}{R_1} + 100, \qquad \text{for all } u(t) \in [0, R_1]$$

$$V_1(t) = 0, \qquad \text{for all } u(t) \in (R_1, 100]$$

-continued $$V_2(t) = -100\frac{u(t) - R_3}{R_2 - R_3} + 100, \quad \text{for all } u(t) \in [R_2, R_3]$$

$$V_2(t) = 0, \quad \text{for all } u(t) \in [0, R_2)$$

$$V_2(t) = 100, \quad \text{for all } u(t) \in (R_3, 100]$$

...

$$V_M(t) = -100\frac{u(t) - R_{2M-2}}{100 - R_{2M-2}} + 100, \quad \text{for all } u(t) \in [R_{2M-2}, 100]$$

$$V_M(t) = 100, \quad \text{for all } u(t) \in [0, R_{2M-2})$$

where $M = 3, 5, 7, \ldots$;

$$V_M(t) = -100\frac{u(t) - 100}{R_{2M-2} - 100} + 100, \quad \text{for all } u(t) \in [R_{2M-2}, 100]$$

$$V_M(t) = 0, \quad \text{for all } u(t) \in [0, R_{2M-2})$$

where $M=4, 6, 8, \ldots$; or equivalent thereof, in which $0<R_1 \leq 100$, $0 \leq R_2 < 100$, $0<R_3 \leq 100$, $R_2<R_3$, ..., $0 \leq R_{2M-2} < 100$; the signals u(t), $V_1(t)$, $V_2(t)$, ..., $V_M(t)$ all having a working rang of 0 to 100.

36. The controller of claim 29 or 33, in which said split-range setter produces the said controller outputs of the form:

$$V_1(t) = 100\frac{u(t) - S_1}{S_1} + 100, \quad \text{for all } u(t) \in [0, S_1]$$

$$V_1(t) = 100, \quad \text{for all } u(t) \in (S_1, 100]$$

$$V_2(t) = -100\frac{u(t) - S_3}{S_2 - S_3} + 100, \quad \text{for all } u(t) \in [S_2, S_3]$$

$$V_2(t) = 0, \quad \text{for all } u(t) \in [0, S_2)$$

$$V_2(t) = 100, \quad \text{for all } u(t) \in (S_3, 100]$$

...

$$V_M(t) = -100\frac{u(t) - 100}{S_{2M-2} - 100} + 100, \quad \text{for all } u(t) \in [S_{2M-2}, 100]$$

$$V_M(t) = 0, \quad \text{for all } u(t) \in [0, S_{2M-2})$$

or equivalent thereof, in which $0<S_1 \leq 100$, $0 \leq S_2 < 100$, $0<S_3 \leq 100$, $S_2<S_3$, ..., $0 \leq S_{2M-2} < 100$, $M=3, 4, 5, 6, \ldots$; $S_j$ being equivalent to $R_j$, $j=1, 2, 3, 4, \ldots$; the signals u(t), $V_1(t)$, $V_2(t)$, ..., $V_M(t)$ all having a working range of 0 to 100.

37. A 1-input-M-output controller for a process having a process output which is controlled by M controller outputs $V_1(t), V_2(t), \ldots, V_M(t)$ applied to M actuators whose outputs are the inputs of said process, said controller comprising:
   a) an error input representative of the difference between a predetermined setpoint and said process output;
   b) a control signal u(t) is of the form:

$$u(t) = f(e(t), t, P_1, P_2, \ldots, P_l),$$

or equivalent thereof, in which t is time, $P_1, P_2, \ldots, P_l$ are the controller tuning parameters; and e(t) is the value of said error input at any given time.
   c) a split-range setter arranged to produce from the said control signal the said controller outputs $V_1(t), V_2(t), \ldots, V_M(t)$.

38. The controller of claim 37, in which the controller gains $P_{11}, P_{12}, P_{13}, \ldots, P_{1M}$ are of the form:

$$P_{11} = K_1 \frac{R_1}{100},$$

$$P_{12} = K_2 \frac{R_3 - R_2}{100},$$

$$P_{13} = K_3 \frac{R_5 - R_4}{100},$$

...

$$P_{1M} = K_M \frac{100 - R_{2M-2}}{100},$$

or equivalent thereof, in which $M=4, 5, 6, \ldots$; $R_2<R_3$, $R_4<R_5$, $R_{2M-2}<R_{2M-1}$, and $K_1, K_2, K_3, \ldots, K_M$ are user-selectable controller gains for the corresponding controller outputs $V_1(t), V_2(t), V_3(t), \ldots, V_M(t)$, respectively.

39. The controller of claim 38, in which the controller gains $P_{11}, P_{12}, P_{13}, \ldots, P_{1M}$ are of the form:

$$P_{1i} = \frac{P_{1,2i-2} + P_{1,2i-3}}{2},$$

$$P_{2i} = \frac{P_{2,2i-2} + P_{2,2i-3}}{2},$$

...

$$P_{l,i} = \frac{P_{l,2i-2} + P_{l,2i-3}}{2},$$

or an equivalent thereof, in which $i=2, 3, 4, \ldots, M$; u(t) is inside the signal overlap area if the signals $V_{i-1}(t)$ and $V_i(t)$ overlap; or u(t) is inside the deadband if a deadband between the signals $V_{i-1}(t)$ and $V_i(t)$ exist.

40. The controller of claim 37, in which said control signal is of the form:

$u(t) = f(e(t), t, P_{11}, P_{21}, \ldots, P_{l1})$, for all $u(t) \in [0, R_1]$ $u(t) = f(e(t), t, P_{12}, P_{22}, \ldots, P_{l2})$, for all $u(t) \in [R_2, R_3]$ $u(t) = f(e(t), t, P_{13}, P_{23}, \ldots, P_{l3})$, for all $u(t) \in [R_4, R_5]$ $u(t) = f(e(t), t, P_{1M}, P_{2M}, \ldots, P_{lM})$, for all $u(t) \in [R_{2M-2}, 100]$ or an equivalent thereof, in which $P_{11}, P_{12}, \ldots, P_{1M}, P_{21}, P_{22}, \ldots, P_{2M}, \ldots, P_{31}, P_{32}, \ldots, P_{3M}, \ldots, P_{l1}, P_{l2}, \ldots, P_{lM}$ are user-selectable parameters, $0<R_1 \leq 100$, $0 \leq R_2 < 100$, $0<R_3 \leq 100$, $0 \leq R_4 < 100$, $0<R_5 \leq 100$, $R_2<R_3$, $R_4<R_5$, ..., $R_{2M-2}<R_{2M-1}$, $0 \leq R_{2M-2} < 100$, $M=4, 5, 6 \ldots$; and e(t) is said error signal.

41. The controller of claim 37, in which said split-range setter produces the said controller outputs of the form:

$$V_1(t) = -100\frac{u(t)}{R_1} + 100, \quad \text{for all } u(t) \in [0, R_1]$$

$$V_1(t) = 0, \quad \text{for all } u(t) \in (R_1, 100]$$

$$V_2(t) = -100\frac{u(t) - R_3}{R_2 - R_3} + 100, \quad \text{for all } u(t) \in [R_2, R_3]$$

$$V_2(t) = 0, \quad \text{for all } u(t) \in [0, R_2)$$

-continued $V_2(t) = 100,$ for all $u(t) \in (R_3, 100]$ $V_3(t) = -100\dfrac{u(t) - R_4}{R_5 - R_4} + 100,$ for all $u(t) \in [R_4, R_5]$ $V_3(t) = 100,$ for all $u(t) \in [0, R_4)$ $V_3(t) = 0,$ for all $u(t) \in (R_5, 100]$

...

$V_M(t) = -100\dfrac{u(t) - R_{2M-2}}{100 - R_{2M-2}} + 100,$ for all $u(t) \in [R_{2M-2}, 100]$ $V_M(t) = 100,$ for all $u(t) \in [0, R_{2M-2})$ where $M = 5, 7, 9, \ldots$ ;

$V_M(t) = -100\dfrac{u(t) - 100}{R_{2M-2} - 100} + 100,$ for all $u(t) \in [R_{2M-2}, 100]$ $V_M(t) = 0,$ for all $u(t) \in [0, R_{2M-2})$ where $M=4, 6, 8, \ldots$ ; or equivalent thereof, in which $0 < R_1 \leq 100$, $0 \leq R_2 < 100$, $0 < R_3 \leq 100$, $0 \leq R_4 < 100$, $0 < R_5 \leq 100$, $R_2 < R_3$, $R_4 < R_5$, ..., $0 \leq R_{2M-2} < 100$; the signals $u(t), V_1(t), V_2(t), \ldots, V_M(t)$ all having a working range of 0 to 100.

42. The controller of claim 37, in which said split-range setter produces the said controller outputs of the form:

$V_1(t) = 100\dfrac{u(t) - S_1}{S_1} + 100,$ for all $u(t) \in [0, S_1]$ $V_1(t) = 100,$ for all $u(t) \in (S_1, 100]$ $V_2(t) = -100\dfrac{u(t) - S_3}{S_2 - S_3} + 100,$ for all $u(t) \in [S_2, S_3]$ $V_2(t) = 0,$ for all $u(t) \in [0, S_2)$ $V_2(t) = 100,$ for all $u(t) \in (S_3, 100]$ $V_M(t) = -100\dfrac{u(t) - 100}{S_{2M-2} - 100} + 100,$ for all $u(t) \in [S_{2M-2}, 100]$ $V_M(t) = 0,$ for all $u(t) \in [0, S_{2M-2})$ or equivalent thereof, in which $0 < S_1 \leq 100$, $0 \leq S_2 < 100$, $0 < S_3 \leq 100$, $0 \leq S_4 < 100$, $0 < S_4 < 100$, $0 < S_5 \leq 100$, $S_2 < S_3$, $S_4 < S_5$, ..., $0 \leq S_{2M-2} < 100$, $M=3, 4, 5, 6, \ldots$ ; the signals $u(t), V_1(t), V_2(t), \ldots, V_M(t)$ all having a working range of 0 to 100.

43. The controller of claim 35, 36, 41, or 42, in which said split-range setter includes individual controls that can be set freely within said split range to produce controller outputs $V_1(t), V_2(t), \ldots, V_M(t)$ that provide a deadband between said controller outputs, an overlap thereof, or a continuum from one to the other.

44. The controller of claim 29, 33 or 37, in which the controller outputs $V_1(t), V_2(t), \ldots, V_M(t)$ are re-scalable from the 0 to 100 range to an engineering value range by using a linear function.

45. The controller of claim 29, 33 or 37, in which the controller outputs $V_1(t), V_2(t), \ldots, V_M(t)$ are arranged to include selectable control limits or control constraints.

46. A single-input-multi-output (SIMO) controller for a process having a process output which is controlled by controller outputs $V_{r1}(t), V_{r2}(t), V_{s1}(t),$ and $V_{s2}(t)$ applied to actuators $A_{r1}, A_{r2}, A_{s1}$ and $A_{s2}$ whose outputs are the inputs of said process, said controller comprising:

a) an error input representative of the difference between a predetermined setpoint and said process output;

b) a control signal u(t) is of the form:

$u(t) = f(e(t), t, P_1, P_2, \ldots, P_1),$ or equivalent thereof, in which t is time, $P_1, P_2, \ldots, P_1$ are the controller tuning parameters; e(t) is the value of said error input at any given time;

c) a combined split-range setter arranged to produce from the said control signal the said controller outputs $V_{r1}(t), V_{r2}(t), V_{s1}(t),$ and $V_{s2}(t)$.

47. The controller of claim 46, in which said combined split-range setter produces the said controller outputs of the form:

$V_{r1}(t) = -100\dfrac{u(t)}{R_1} + 100,$ for all $u(t) \in [0, R_1]$ $V_{r1}(t) = 0,$ for all $u(t) \in (R_1, 100]$ $V_{r2}(t) = -100\dfrac{u(t) - 100}{R_2 - 100} + 100,$ for all $u(t) \in [R_2, 100]$ $V_{r2}(t) = 0,$ for all $u(t) \in [0, R_2)$ $V_{s1}(t) = 100\dfrac{u(t) - S_1}{S_1} + 100,$ for all $u(t) \in [0, S_1]$ $V_{s1}(t) = 100,$ for all $u(t) \in (S_1, 100]$ $V_{s2}(t) = -100\dfrac{u(t) - 100}{S_2 - 100} + 100,$ for all $u(t) \in [S_2, 100]$ $V_{s2}(t) = 0,$ for all $u(t) \in [0, S_2)$ or equivalent thereof, in which $0 < R_1 \leq 100$, $0 \leq R_2 < 100$, $0 < S_1 \leq 100$, $0 < S_2 < 100$, the signals $u(t), V_{r1}(t), V_{r2}(t), V_{s1}(t),$ and $V_{s2}(t)$ all having a working range of 0 to 100.

48. The controller of claim 47, in which said combined split-range setter includes individual controls that can be set freely within said split ranges to produce controller outputs $V_{r1}(t), V_{r2}(t), V_{s1}(t),$ and $V_{s2}(t)$ that provide a deadband between said controller outputs, an overlap thereof, or a continuum from one to the other.

49. The controller of claim 46, in which the controller outputs $V_{r1}(t), V_{r2}(t), V_{s1}(t),$ and $V_{s2}(t)$ are re-scalable from the 0 to 100 range to an engineering value range by using a linear function.

50. The controller of claim 46, in which the controller outputs $V_{r1}(t), V_{r2}(t), V_{s1}(t),$ and $V_{s2}(t)$ are arranged to include selectable control limits or control constraints.

51. The controller of claim 1, 8, 19, 29, 33, 37, or 46, in which said controller is a computer program embodied in a digital medium.

* * * * *